(12) United States Patent
  Gettens et al.

(10) Patent No.: US 12,005,728 B2
(45) Date of Patent: Jun. 11, 2024

(54) USE OF NANOPARTICLES TO TUNE INDEX OF REFRACTION OF LAYERS OF A POLYMERIC MATRIX TO OPTIMIZE MICROOPTIC (MO) FOCUS

(71) Applicant: CRANE & CO., INC., Dalton, MA (US)

(72) Inventors: Nancy J. Gettens, Waban, MA (US); Jonathan D. Gosnell, Cumming, GA (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 17/612,962

(22) PCT Filed: May 20, 2020

(86) PCT No.: PCT/US2020/070064
§ 371 (c)(1),
(2) Date: Nov. 19, 2021

(87) PCT Pub. No.: WO2020/237259
PCT Pub. Date: Nov. 26, 2020

(65) Prior Publication Data
US 2022/0227160 A1  Jul. 21, 2022

Related U.S. Application Data

(60) Provisional application No. 62/864,448, filed on Jun. 20, 2019, provisional application No. 62/850,337, filed on May 20, 2019.

(51) Int. Cl.
  *B42D 25/324* (2014.01)
  *B42D 25/23* (2014.01)
  (Continued)

(52) U.S. Cl.
  CPC ......... *B42D 25/324* (2014.10); *B42D 25/373* (2014.10); *C08F 265/06* (2013.01);
  (Continued)

(58) Field of Classification Search
  CPC .. C08F 265/06; C08F 283/065; C08F 283/06; C08K 3/105; C08K 3/22; C08K 3/30;
  (Continued)

(56) References Cited

U.S. PATENT DOCUMENTS 5,712,731 A  1/1998  Drinkwater et al.
6,432,526 B1  8/2002  Arney et al.
  (Continued)

FOREIGN PATENT DOCUMENTS

CN  102138087 A  7/2011
CN  102497994 A  6/2012
  (Continued)

OTHER PUBLICATIONS

Re-examination report dated Sep. 21, 2022 in connection with Australian Patent Application No. 2020279477, 7 1 pages.
  (Continued)

*Primary Examiner* — Justin V Lewis

(57) ABSTRACT

A security device (100, 600, 700) includes one or more arrangements of image icons (100a, 110b, 615, 715), one or more arrangements of refractive image icon focusing elements (120, 605, 705), and a sealing layer (127, 600, 1005) which includes an organic resin and nanoparticles. Further, the one or more arrangements of refractive image icon focusing elements is disposed above the one or more arrangements of image icons such that a portion of the one or more arrangements of refractive image icon focusing elements forms a synthetic image of a portion of the one or more arrangements of image icons. Still further, the one or
  (Continued)

more arrangements of refractive image icon focusing elements contact the sealing layer along a non-planar boundary.

20 Claims, 15 Drawing Sheets

(51) Int. Cl.
| | |
|---|---|
| *B42D 25/24* | (2014.01) |
| *B42D 25/29* | (2014.01) |
| *B42D 25/351* | (2014.01) |
| *B42D 25/373* | (2014.01) |
| *B42D 25/425* | (2014.01) |
| *B82Y 30/00* | (2011.01) |
| *C08F 265/06* | (2006.01) |
| *C08F 283/06* | (2006.01) |
| *C08K 3/105* | (2018.01) |
| *C08K 3/22* | (2006.01) |
| *C08K 3/30* | (2006.01) |
| *D21H 19/58* | (2006.01) |
| *D21H 21/40* | (2006.01) |
| *G02B 1/04* | (2006.01) |
| *G02B 3/00* | (2006.01) |
| *G02B 27/16* | (2006.01) |

(52) U.S. Cl.
CPC .......... *C08F 283/065* (2013.01); *C08K 3/105* (2018.01); *C08K 3/22* (2013.01); *C08K 3/30* (2013.01); *D21H 19/58* (2013.01); *D21H 21/40* (2013.01); *G02B 1/041* (2013.01); *G02B 3/0037* (2013.01); *G02B 27/16* (2013.01); *B42D 25/23* (2014.10); *B42D 25/24* (2014.10); *B42D 25/29* (2014.10); *B42D 25/351* (2014.10); *B42D 25/425* (2014.10); *B82Y 30/00* (2013.01); *C08K 2003/2227* (2013.01); *C08K 2003/2241* (2013.01); *C08K 2003/2244* (2013.01); *C08K 2003/3036* (2013.01)

(58) Field of Classification Search
CPC .... C08K 2003/2227; C08K 2003/2241; C08K 2003/2244; C08K 2003/3036; D21H 19/58; D21H 21/40; G02B 1/041; G02B 1/04; G02B 3/0037; G02B 3/00; G02B 27/16; B42D 25/29; B42D 25/351; B82Y 30/00
USPC .................. 283/72, 74, 91, 94, 95, 98, 901
See application file for complete search history.

(56) References Cited

U.S. PATENT DOCUMENTS

| | | |
|---|---|---|
| 6,836,371 B2 | 12/2004 | Lai et al. |
| 7,468,842 B2 | 12/2008 | Steenblik et al. |
| 7,821,691 B2 | 10/2010 | Walter et al. |
| 7,982,930 B2 | 7/2011 | Kutsch et al. |
| 8,077,393 B2 | 12/2011 | Steenblik et al. |
| 8,111,462 B2 | 2/2012 | Steenblik et al. |
| 8,120,855 B2 | 2/2012 | Steenblik et al. |
| 8,144,399 B2 | 3/2012 | Steenblik et al. |
| 8,149,511 B2 | 4/2012 | Kaule et al. |
| 8,164,810 B2 | 4/2012 | Phillips et al. |
| 8,254,030 B2 | 8/2012 | Steenblik et al. |
| 8,361,599 B2 | 1/2013 | Jones et al. |
| 8,498,033 B2 | 7/2013 | Witzman et al. |
| 8,557,369 B2 | 10/2013 | Hoffmuller et al. |
| 8,773,763 B2 | 7/2014 | Steenblik et al. |
| 8,867,134 B2 | 10/2014 | Steenblik et al. |
| 8,883,273 B2 | 11/2014 | Whiteman |
| 8,927,072 B2 | 1/2015 | Whiteman |
| 9,004,540 B2 | 4/2015 | Rahm et al. |
| 9,019,613 B2 | 4/2015 | Raymond et al. |
| 9,097,854 B2 | 8/2015 | Witzman et al. |
| 9,272,564 B2 | 3/2016 | Whiteman |
| 9,283,798 B2 | 3/2016 | Jolic |
| 9,289,962 B2 | 3/2016 | Chen-Ho et al. |
| 9,482,792 B2 | 11/2016 | Cape et al. |
| 9,592,700 B2 | 3/2017 | Raymond et al. |
| 9,610,619 B2 | 4/2017 | Lawandy |
| 9,676,009 B2 | 6/2017 | Lawandy |
| 9,678,475 B2 | 6/2017 | Richert et al. |
| 9,701,152 B2 | 7/2017 | Ritter et al. |
| 9,731,539 B2 | 8/2017 | Lister |
| 9,802,437 B2 | 10/2017 | Holmes |
| 9,844,969 B2 | 12/2017 | Ritter et al. |
| 9,873,282 B2 | 1/2018 | Jolic |
| 9,902,187 B2 | 2/2018 | Holmes |
| 9,956,807 B2 | 5/2018 | Staub et al. |
| 10,048,568 B2 | 8/2018 | Williams |
| 10,093,124 B2 | 10/2018 | Holmes |
| 10,252,561 B2 | 4/2019 | Richert et al. |
| 10,281,626 B2 | 5/2019 | Jiang et al. |
| 10,328,737 B2 | 6/2019 | Lok et al. |
| 10,434,812 B2 | 10/2019 | Cape et al. |
| 10,539,727 B2 | 1/2020 | England et al. |
| 10,864,762 B2 | 12/2020 | Bleiman et al. |
| 11,207,910 B2 | 12/2021 | Holmes |
| 2008/0024846 A1 | 1/2008 | Tompkin et al. |
| 2008/0037131 A1 | 2/2008 | Steenblik et al. |
| 2009/0122412 A1 | 5/2009 | Steenblik et al. |
| 2009/0273834 A1 | 11/2009 | Korenaga |
| 2009/0322071 A1 | 12/2009 | Dichtl |
| 2010/0109317 A1 | 5/2010 | Hoffmuller et al. |
| 2010/0308571 A1 | 12/2010 | Steenblik et al. |
| 2011/0019283 A1* | 1/2011 | Steenblik ............. G02B 3/0031 359/627 |
| 2011/0122494 A1 | 5/2011 | Sherman et al. |
| 2012/0088079 A1 | 4/2012 | Downing et al. |
| 2013/0056971 A1 | 3/2013 | Holmes |
| 2014/0376091 A1 | 12/2014 | Jordan et al. |
| 2015/0037535 A1 | 2/2015 | Akimoto et al. |
| 2015/0061280 A1 | 3/2015 | Power |
| 2015/0140292 A1 | 5/2015 | Chen-Ho et al. |
| 2017/0210161 A1 | 7/2017 | Cape et al. |
| 2018/0001692 A1 | 1/2018 | Rich et al. |
| 2018/0056614 A1 | 3/2018 | Bhagat et al. |
| 2018/0147879 A1 | 5/2018 | Morton et al. |
| 2018/0196980 A1 | 7/2018 | Holmes et al. |
| 2018/0239070 A1 | 8/2018 | England et al. |
| 2018/0272788 A1 | 9/2018 | Bleiman et al. |
| 2019/0061407 A1 | 2/2019 | Godfrey |
| 2019/0105938 A1 | 4/2019 | Holmes et al. |
| 2019/0107726 A1 | 4/2019 | Phillips et al. |
| 2019/0118571 A1 | 4/2019 | Jolic et al. |
| 2019/0176507 A1 | 6/2019 | Lister |
| 2019/0232708 A1 | 8/2019 | Holmes et al. |
| 2021/0070090 A1 | 3/2021 | Godfrey et al. |
| 2021/0253879 A1 | 8/2021 | Hardwick et al. |
| 2022/0097437 A1 | 3/2022 | Grigorenko et al. |

FOREIGN PATENT DOCUMENTS

| | | |
|---|---|---|
| CN | 102712206 A | 10/2012 |
| CN | 102844198 A | 12/2012 |
| CN | 102869517 A | 1/2013 |
| CN | 104024921 A | 9/2014 |
| CN | 104884265 A | 9/2015 |
| CN | 109414947 A | 3/2019 |
| DE | 102013203303 B3 | 6/2014 |
| EP | 0560180 A2 | 9/1993 |
| EP | 1152907 A1 | 11/2001 |
| EP | 1538554 A2 | 6/2005 |
| EP | 1882961 A1 | 1/2008 |
| EP | 2121337 A1 | 11/2009 |
| EP | 2687548 A1 | 1/2014 |
| EP | 1878584 B1 | 4/2014 |
| EP | 2841284 A1 | 3/2015 |
| EP | 2890847 A1 | 7/2015 |
| EP | 2212121 B1 | 12/2015 |

(56) References Cited

FOREIGN PATENT DOCUMENTS

| | | | |
|---|---|---|---|
| EP | 1965990 | B1 | 7/2016 |
| EP | 3042238 | A1 | 7/2016 |
| EP | 2882597 | B1 | 2/2017 |
| EP | B122572 | A2 | 2/2017 |
| EP | 2161598 | B1 | 3/2017 |
| EP | 2399756 | B1 | 7/2017 |
| EP | 2951023 | B1 | 10/2017 |
| EP | 3236299 | A1 | 10/2017 |
| EP | 3024662 | B1 | 11/2017 |
| EP | 3024665 | B1 | 11/2017 |
| EP | 2766776 | B1 | 12/2017 |
| EP | 3294569 | A1 | 3/2018 |
| EP | 2895922 | B1 | 4/2018 |
| EP | 3356156 | A2 | 8/2018 |
| EP | 2580292 | B1 | 10/2018 |
| EP | 3448691 | A1 | 3/2019 |
| EP | 2121337 | B1 | 7/2019 |
| EP | 3519202 | A1 | 8/2019 |
| EP | 3445592 | B1 | 11/2021 |
| JP | 2000-206894 | A | 7/2000 |
| JP | 2001-305305 | A | 10/2001 |
| JP | 2007-515665 | A | 6/2007 |
| JP | 2008-081726 | A | 4/2008 |
| JP | 2008-545550 | A | 12/2008 |
| JP | 2011-178841 | A | 9/2011 |
| JP | 2016-136245 | A | 7/2016 |
| JP | 2017-083686 | A | 5/2017 |
| JP | 2018-156110 | A | 10/2018 |
| JP | 2019-001022 | A | 1/2019 |
| KR | 10-2101798 | B1 | 4/2020 |
| WO | 2004097112 | A1 | 11/2004 |
| WO | 2008111579 | A1 | 9/2008 |
| WO | 2011075815 | A1 | 6/2011 |
| WO | 2012162041 | A2 | 11/2012 |
| WO | 2013188518 | A1 | 12/2013 |
| WO | 2017009622 | A1 | 1/2017 |
| WO | 2017194911 | A1 | 11/2017 |
| WO | 2017198486 | A2 | 11/2017 |
| WO | 2018060726 | A1 | 4/2018 |
| WO | 2018164574 | A1 | 9/2018 |
| WO | 2018204982 | A1 | 11/2018 |
| WO | 2018226484 | A1 | 12/2018 |
| WO | 2019002855 | A1 | 1/2019 |
| WO | 2019002872 | A1 | 1/2019 |
| WO | 2019043366 | A1 | 3/2019 |
| WO | 2019064002 | A1 | 4/2019 |
| WO | 2019070335 | A1 | 4/2019 |
| WO | 2019186189 | A1 | 10/2019 |
| WO | 2022053828 | A1 | 3/2022 |

OTHER PUBLICATIONS

2 Office Action dated Aug. 22, 2022 in connection with India Patent Application No. 202127050165, 7 pages.
3 Office Action dated Oct. 20, 2022 in connection with U.S. Appl. No. 17/612,932, 10 pages.
Communication pursuant to Article 94(3) EPC dated Feb. 17, 2023 in connection with European Patent Application No. 20 809 888.9, 6 pages.
International Search Report and Written Opinion of the International Searching Authority dated Jul. 30, 2020 in connection with International Application No. PCT/US2020/070064, 8 pages.
Re-examination report dated Dec. 22, 2022 in connection with Australian Patent Application No. 2020279477, 4 pages.
Notice on the Result of Substantive Examination dated Feb. 13, 2023 in connection with Indonesian Application No. P00202109932, 6 pages.
Notice on the Result of Substantive Examination dated Nov. 21, 2022 in connection with Indonesian Application No. P00202109925, 4 pages.
Notice on the Result of Substantive Examination dated Jan. 12, 2023 in connection with Indonesian Application No. P00202109941, 6 pages.
Examination report dated Jan. 18, 2022 in connection with Australian Application No. 2020279477, 2 pages.
First Office Action dated Mar. 24, 2023, in connection with Chinese Application No. 202080033259.X, 14 pages.
Notice of acceptance for patent application dated May 12, 2022, in connection with Australian Application No. 2020279477, 3 pages.
Notification of material filed by a third party dated Jul. 13, 2022, in connection with Australian Application No. 2020279477, 5 pages.
Supplemenary European Search Report dated Jun. 10, 2022, in connection with European Application No. 20809888.9, 9 pages.
Non-final Office Action dated Jun. 24, 2022, in connection with U.S. Appl. No. 17/612,932, 9 pages.
International Search Report and Written Opinion of the International Searching Authority dated Aug. 6, 2020 in connection with International Application No. PCT/US2020/070065, 5 pages.
International Search Report and Written Opinion of the International Searching Authority dated Jul. 30, 2020 in connection with International Application No. PCT/US2020/070066, 8 pages.
Supplementary Partial European Search Report dated Jun. 9, 2023, in connection with European Application No. 20808618.1, 13 pages.
Supplementary European Search Report dated Jun. 14, 2023, in connection with European Application No. 20810649.2, 9 pages.
Non-final Office Action dated May 11, 2023, in connection with U.S. Appl. No. 17/612,932, 8 pages.
Notice of Allowance dated Nov. 13, 2023, in connection with U.S. Appl. No. 17/612,932, 8 pages.
European Search Report dated Jan. 4, 2024, in connection with European Application No. 23202420.8, 9 pages.
Decision to Grant dated Oct. 27, 2023, in connection with Russian Application No. 2021134813/28(073502), 20 pages.
Decision to Grant dated Oct. 27, 2023, in connection with Russian Application No. 2021134812/28(073501), 22 pages.
Second review of opinion notice dated Oct. 19, 2023, in connection with Chinese Application No. 202080033259.X, 14 pages.
Office action dated Nov. 21, 2023, in connection with Russian Application No. 2021134809/28(073496), 17 pages.
Final Office Action dated Aug. 29, 2023, in connection with U.S. Appl. No. 17/612,932, 6 pages.
Supplementary European Search Report dated Sep. 28, 2023, in connection with European Application No. 20808618.1, 15 pages.
Examination Report dated Oct. 20, 2023, in connection with Australian Application No. 2022221549, 3 pages.
Chinese National Intellectual Property Administration, First Office Action issued Feb. 6, 2024 regarding Application No. 202080034264.2, 16 pages.
Indian Patent Office, Examination Report issued Jan. 15, 2024 regarding Application No. 202127050166, 7 pages.
Chinese National Intellectual Property Administration, Notification To Grant Patent Right issued Jan. 23, 2024 regarding Application No. 202080033259.X, 7 pages.
USPTO, Office Action issued Feb. 1, 2024 regarding U.S. Appl. No. 17/612,949, 9 pages.
Chinese National Intellectual Property Administration, First Office Action issued Feb. 7, 2024 regarding Application No. 202080034270.8, 18 pages.
Decision to Grant dated Mar. 1, 2024, in connection with Russian Application No. 2021134809/28(073496), 17 pages.
Notice of Reasons for Refusal dated Mar. 5, 2024, in connection with Japanese Application No. 2021-567827, 9 pages.
Notice of Reasons for Refusal dated Mar. 26, 2024, in connection with Japanese Application No. 2021-567828, 8 pages.
Notice of Reasons for Refusal dated Apr. 2, 2024, in connection with Japanese Application No. 2021-567833, 10 pages.

\* cited by examiner

USE OF NANOPARTICLES TO TUNE INDEX OF REFRACTION OF LAYERS OF A POLYMERIC MATRIX TO OPTIMIZE MICROOPTIC (MO) FOCUS

CROSS-REFERENCE TO RELATED APPLICATIONS

This application is a 371 National Stage of International Application No. PCT/US2020/070064, filed May 20, 2020, which claims the benefit of Provisional Application No. 62/850,337, filed May 20, 2019, and Provisional Application No. 62/864,448, filed Jun. 20, 2019, the disclosures of which are herein incorporated by reference in their entirety.

TECHNICAL FIELD

This disclosure relates generally to improving the performance of security devices, such as micro-optic strips applied to, or otherwise incorporated in, security documents to provide counterfeit-resistant indicia of authenticity. More specifically, this disclosure relates to, without limitation, the use of nanoparticles to tune an index of refraction of a polymeric matrix (sometimes referred to as a "goo") used to form one or more layers of a micro-optic security device to optimize micro-optic ("MO") focus.

BACKGROUND

In many cases, the challenges of designing and manufacturing certain micro-optic security devices, include negotiating trade-offs between realizing desirable properties of an end product against the opportunities and constraints imposed by, for example, available manufacturing techniques and the laws of physics. For example, manufacturers of security documents (for example, banknotes, checks, and other documents presenting a need for trustworthy indicia of authenticity) desire micro-optic security devices which are one or more of: thin, durable, counterfeit-resistant and visually engaging. At the same time, the properties of the materials used, in combination with the laws of physics used to construct micro-optic security devices can impose constraints on the performance characteristics of end products. As one non-limiting example, lenses made of material with a low refractive index will be thicker than lenses of equivalent focal length made of material with a high refractive index. As a further non-limiting example, the interplay between light waves and the constituent materials of a lens can cause chromatic aberrations, whereby the focal length of the lens varies across different wavelengths of light.

In view of the above, tuning the physical properties (for example, component thicknesses and indices of refraction) of materials for making micro-optic security devices, presents untapped opportunities to push the envelope with regard to realizing a greater set of desirable end-product characteristics (for example, overall thickness, resistance to soiling) within the constraints imposed by the operation of the laws of physics on the materials chosen.

SUMMARY

This disclosure illustrates, without limitation embodiments of systems and methods using nanoparticles to tune an index of refraction of a polymeric matrix to optimize micro-optic ("MO") focus, as well as embodiments of micro-optic systems using low-RI materials in one or more constituent layers of the system.

In a first embodiment, a security device includes one or more arrangements of image icons, one or more arrangements of refractive image icon focusing elements, and a sealing layer. Further, the one or more arrangements of refractive image icon focusing elements is disposed above the one or more arrangements of image icons such that a portion of the one or more arrangements of refractive image icon focusing elements projects a synthetic image of a portion of the one or more arrangements of image icons. Still further, the one or more arrangements of refractive image icon focusing elements contact the sealing layer along a non-planar boundary. Additionally, at least one of the one or more arrangements of refractive image icon focusing elements and the sealing layer includes an organic resin and nanoparticle mixture having a first refractive index.

In a second embodiment, a security device includes one or more arrangements of image icons and one or more arrangements of refractive image icon focusing elements, the one or more arrangements of refractive image icon focusing elements comprising a mixture of an organic resin and nanoparticles. The one or more arrangements of refractive image icon focusing elements is disposed above the one or more arrangements of image icons such that a portion of the one or more arrangements of refractive image icon focusing elements projects a synthetic image of a portion of the one or more arrangements of image icons. The mixture of the organic resin and nanoparticles has an index of refraction greater than 1.5.

In a third embodiment, a security document includes a substrate and a security device. The security device includes one or more arrangements of image icons, one or more arrangements of refractive image icon focusing elements, and a sealing layer. Further, the one or more arrangements of refractive image icon focusing elements is disposed above the one or more arrangements of image icons such that a portion of the one or more arrangements of refractive image icon focusing elements projects a synthetic image of a portion of the one or more arrangements of image icons. Still further, the one or more arrangements of refractive image icon focusing elements contact the sealing layer along a non-planar boundary. Additionally, at least one of the one or more arrangements of refractive image icon focusing elements and the sealing layer includes an organic resin and nanoparticle mixture having a first refractive index.

In a fourth embodiment, a security document includes a substrate and a security device. The security device includes one or more arrangements of image icons and one or more arrangements of refractive image icon focusing elements, the one or more arrangements of refractive image icon focusing elements comprising a mixture of an organic resin and nanoparticles. The one or more arrangements of refractive image icon focusing elements is disposed above the one or more arrangements of image icons such that a portion of the one or more arrangements of refractive image icon focusing elements projects a synthetic image of a portion of the one or more arrangements of image icons. The mixture of the organic resin and nanoparticles has an index of refraction greater than 1.5.

In a fifth embodiment, a security device includes one or more arrangements of image icons, one or more arrangements of refractive image icon focusing elements, and a spacer layer disposed between the one or more arrangements of image icons and the one or more arrangements of refractive image icon focusing elements. The spacer layer includes a mixture of an organic resin and nanoparticles. Additionally, the one or more arrangements of refractive image icon focusing elements is disposed above the one or more arrangements of image icons such that a portion of the one or more arrangements of refractive image icon focusing elements projects a synthetic image of a portion of the one or more arrangements of image icons. Further, the mixture of the organic resin and nanoparticles has an index of refraction greater than 1.5.

In a sixth embodiment, a security document incudes a substrate, one or more arrangements of image icons, one or more arrangements of refractive image icon focusing elements, and a spacer layer disposed between the one or more arrangements of image icons and the one or more arrangements of refractive image icon focusing elements. The spacer layer includes a mixture of an organic resin and nanoparticles. Additionally, the one or more arrangements of refractive image icon focusing elements is disposed above the one or more arrangements of image icons such that a portion of the one or more arrangements of refractive image icon focusing elements projects a synthetic image of a portion of the one or more arrangements of image icons. Further, the mixture of the organic resin and nanoparticles has an index of refraction greater than 1.5.

In a seventh embodiment, a security device includes an arrangement of image icon focusing elements, wherein each image icon focusing element of the arrangement of image icon focusing elements is associated with a focal path, an image icon layer comprising one or more image icons associated with a first characteristic color and one or more image icons associated with a second characteristic color, and one or more regions between image icons comprising a volume of substantially colorless material. Additionally, at a first viewing angle, a color is visible through each image icon focusing element, and the color visible through each image icon focusing element at the first viewing angle is based on one or more of the first characteristic color, the second characteristic color, or the substantially colorless material.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1A through 10B, discussed below, and the various embodiments used to describe the principles of this disclosure in this patent document are by way of illustration only and should not be construed in any way to limit the scope of the disclosure.

Figure 1A:
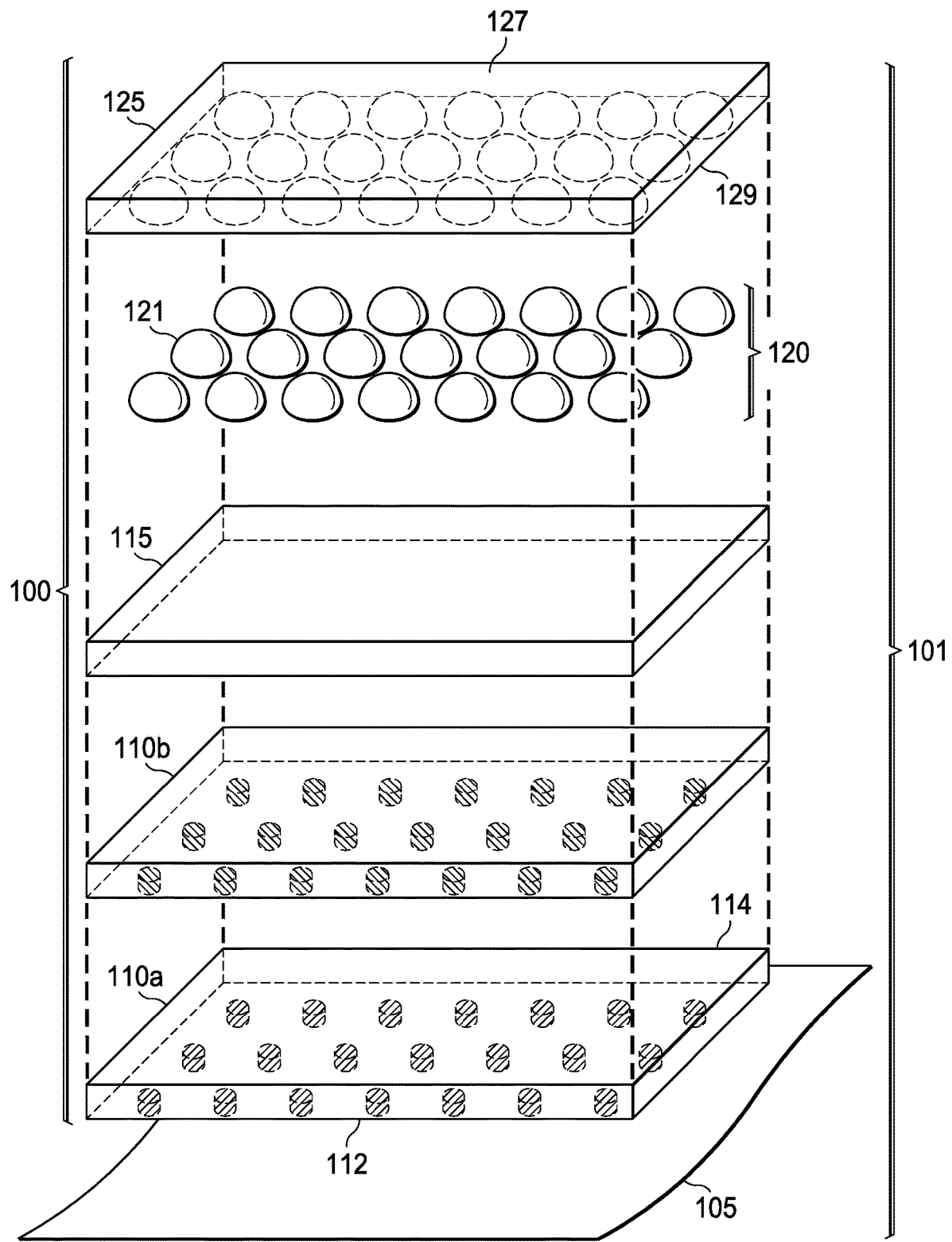
FIGS. 1A, 1B and 1C illustrate examples of elements of micro-optic security devices and security documents comprising micro-optic security devices according to certain embodiments of this disclosure.
Figure 1B:
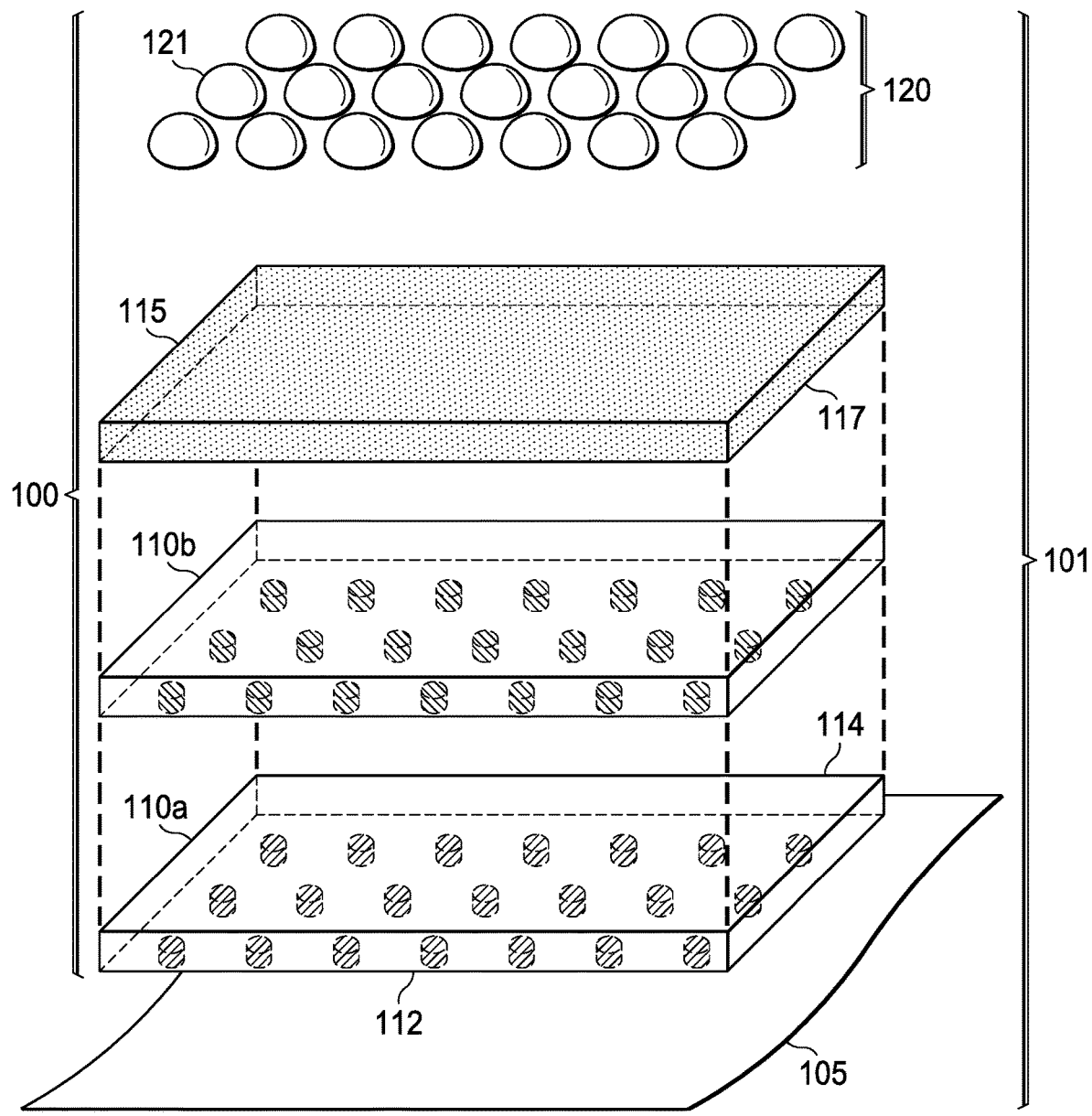
Figure 1C:
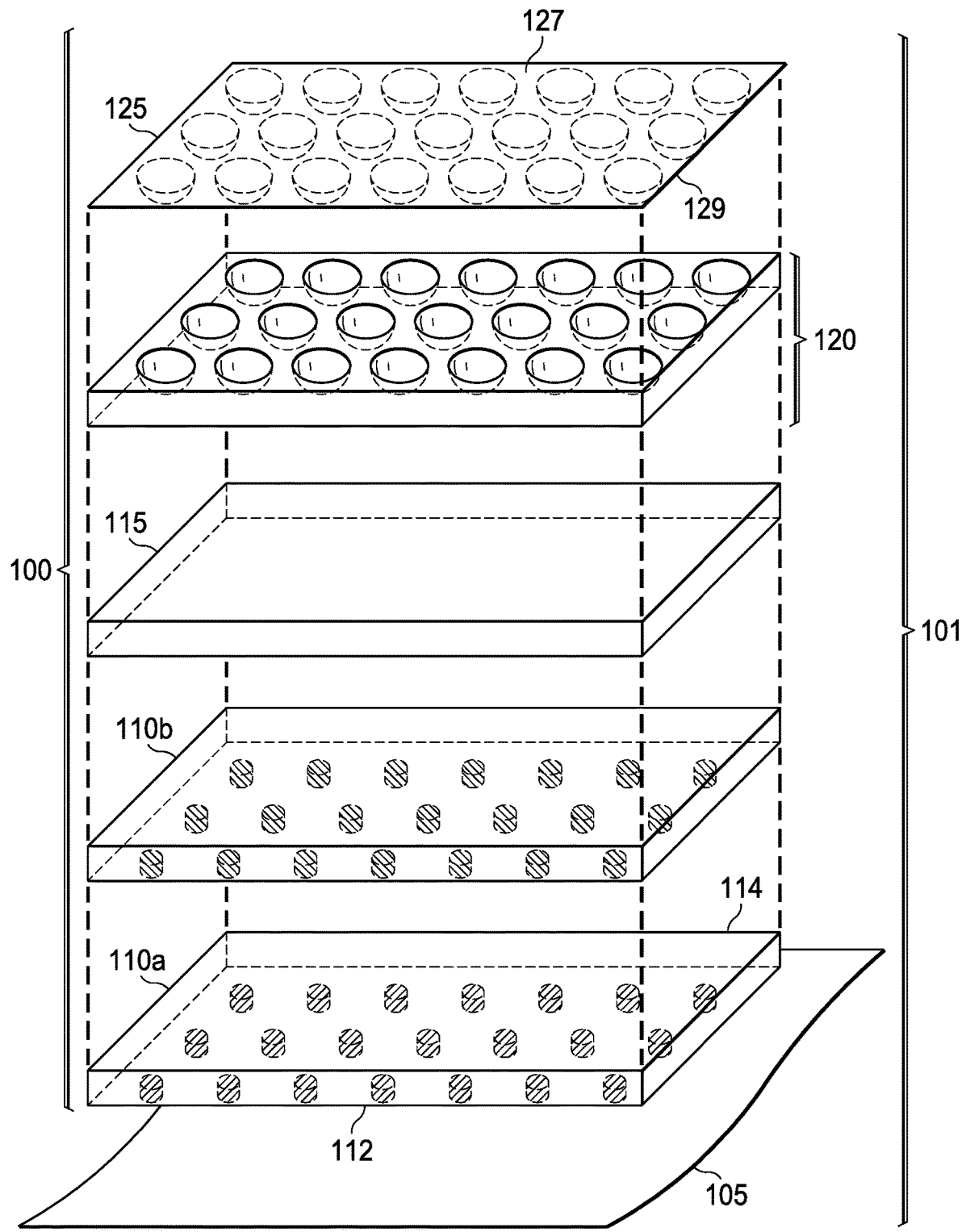

FIGS. 1A, 1B and 1C illustrate examples of elements of micro-optic security devices and security documents comprising micro-optic security devices according to certain embodiments of this disclosure. For convenience, structural elements common to the examples of FIGS. 1A, 1B and 1C are numbered similarly (for example, substrate 105).

Referring to the non-limiting example of FIG. 1A, micro-optic security devices 100 and security documents 101 can be constructed as layered combinations of some or all of the elements shown in the illustrative example of FIG. 1A.

As shown in the illustrative example of FIG. 1A, a security document 101 comprises a substrate 105 to which a micro-optic security device 100 is attached. As used in this disclosure, the term "security document" encompasses documents which utilize a micro-optic security device to provide counterfeit-resistant visual indicia (for example, a synthetic image created by a spatial alignment of one or more arrangements of image icons with one or more refractive image icon focusing elements) of the document's authenticity. Examples of security documents include, without limitation, banknotes, passports, tickets, collectible trading cards, identity cards (for example, driver's licenses).

According to certain embodiments, substrate 105 is a sheet of a thin, flexible fibrous material, such as currency paper. According to some embodiments, substrate 105 is a thin, flexible sheet of a polymeric film, biaxially oriented polypropylene (BOPP). In various embodiments, substrate 105 is a section of a synthetic paper material, such as TESLIN®. According to some embodiments, substrate 105 is a section of a polymeric card material, such as a polyethylene terephthalate (PET) blank of a type suitable for making credit cards and driver's licenses.

Referring to the non-limiting example of FIG. 1A, a micro-optic security device 100 includes one or more arrangements of image icons (110a and 110b). According to various embodiments, the one or more arrangements of image icons comprise colored regions of pigmented material (for example, colored region 112) disposed in a predetermined pattern (for example, as icons designs to be synthetically magnified by one or more arrangements of refractive image icon focusing elements). According to various embodiments, colored region 112 comprises a shaped volume of a pigmented image material (for example, a pigmented UV curable polymer). In certain embodiments, colored region 112 has a width of approximately 1 µm or greater.

According to certain embodiments, each of the one or more arrangements of image icons 110a and 110b is formed as a separate layer. In some embodiments, an arrangement of image icons is formed by creating an icon layer structure (for example, by embossing a polymeric matrix and curing same) to create holding structures, such as recesses or voids for retaining one or more pigmented polymeric materials, and then applying the one or more pigmented polymeric materials to create colored regions (for example, colored region 112) collectively defining an array of image icons.

In various embodiments, for a given arrangement of image icons, the pigmented polymeric material used to create the colored regions (for example, colored region 112) is constructed such that most, or all of the colored regions, are filled with polymeric material of a characteristic color. As used in this disclosure, the term "characteristic color" encompasses a color associated with a specified wavelength of light, or a range of wavelengths of light for which the focal length of a refractive image icon focusing element aligns with the depth of the arrangement of image icons within micro-optic security device 100.

As shown in the non-limiting example of FIG. 1A, certain embodiments according to the present disclosure, of a micro-optic security device 100 comprise two stacked arrangements of image icons (110a and 110b). Embodiments according to this disclosure are not limited to two arrangements of image icons, and embodiments with fewer or more arrangements of image icons are within the contemplated scope of this disclosure.

According to various embodiments, the index of refraction of the polymeric matrix used to create retaining structures (for example, retaining structure 114) for the one or more pigmented materials in one arrangement of image icons (for example, arrangement of image icons 110b) can be tuned through the addition of nanoparticles to the matrix to improve the focus of light on another arrangement of image icons (for example, arrangement of image icons 110a).

In certain embodiments according to this disclosure, micro-optic security device 100 is attached to substrate 105 by means of an adhesive bond between a bottom surface of an arrangement of image icons (for example, arrangement of image icons 110a). In some embodiments, micro-optic security device is attached to substrate 105 as part of the process of manufacturing substrate 105 (for example, as a windowed security thread in a sheet of currency paper).

Referring to the non-limiting example of FIG. 1A, in certain embodiments, micro-optic security device 100 includes optical spacer 115. According to some embodiments, optical spacer 115 comprises a thin film of clear material (for example, polyester), to which a polymeric matrix for creating refractive image icon focusing elements and/or retaining structures (for example, retaining structure 114) for pigmented materials, is applied, shaped (for example, by embossing) and cured. In some embodiments, optical spacer 115 is formed as a layer of a polymeric matrix and integrated with one or more arrangements of refractive image icon focusing elements. According to various embodiments, optical properties of micro-optic security device 100 (for example, quality of focus on an arrangement of image icons or internal reflections within the security device) including an optical spacer 115 formed from a polymeric matrix can be adjusted or tuned by varying the thickness of optical spacer 115 and/or adjusting a concentration of nanoparticles in a polymeric matrix used to form optical spacer 115. According to certain embodiments, optical spacer 115 is formed from a polymeric matrix suitable for use in forming sealing layer 125 or refractive focusing element 121. In various embodiments, the composition of the matrix used to form optical spacer 115 is specifically formulated to not include materials with a polarizing element, such as iodine, bromine, chlorine or sulfur.

Additionally, while in the non-limiting example of FIG. 1A, micro-optic security device 100 is shown as including optical spacer 115, embodiments according to this disclosure are not so limited. In certain embodiments, optical spacer 115 can be omitted. Further, while in the non-limiting example of FIG. 1A, optical spacer 115 is shown as being physically distinct from an arrangement of refractive image icon focusing elements, embodiments according to this disclosure are not so limited, and embodiments in which one or more arrangements of refractive image icon focusing elements are formed by creating structured variations in the index of refraction of a material used to create optical spacer 115 are within the contemplated scope of this disclosure.

Referring to the illustrative example of FIG. 1A, in certain embodiments, micro-optic security device 100 comprises one or more arrangements of refractive image icon focusing elements 120 which are disposed above one or more arrangements of image icons (for example, arrangements of image icons 110a and 110b) such that a portion of the one or more arrangements of refractive image icon focusing elements projects a synthetic image of a portion of the one or more arrangements of image icons. As discussed elsewhere in this disclosure, in certain embodiments, two or more synthetic images are produced, wherein each synthetic image is associated with a characteristic color.

As shown in the non-limiting example of FIG. 1A, an arrangement of refractive image icon focusing elements 120 comprises a plurality of individual refractive focusing elements (for example, refractive focusing element 121), arranged in a predetermined pattern relative to at least one arrangement of image icons (for example, arrangement of image icons 110*a*). In certain embodiments, the colored regions of an arrangement of image icons are substantially co-located in a plane defining the x and y axes of a coordinate system. In some embodiments, the centers of the refractive focusing elements are located at common x and y values to the image icons, but at different coordinates on a z-axis. In some embodiments, the synthetic image may appear to as being in the plane of micro-optic security device 100. In some embodiments, the center-to-center distances (i.e., the pitch) of the refractive focusing elements may be slightly different from a repetition distance of the image icons, and the synthetic image(s) may appear to be above or below the plane of micro-optic security device 100. In various embodiments, the centers of the refractive focusing elements may be slightly (e.g., at an angle of less than 1 degree) rotated relative to the image icons, creating ortho-parallactic motion effects.

In certain embodiments, refractive focusing element 121 comprises a volume of a cured polymeric matrix with at least one exterior surface defining a non-planar boundary between a region of a medium with a first index of refraction and a region of a medium with a second index of refraction. While, in the non-limiting example of FIG. 1A, refractive focusing element 121 is shown as having a planar lower surface and radially symmetric curved top surface, embodiments according to this disclosure are not so limited. According to some embodiments, refractive focusing element can be a lenticle of a lenticular array, or can, for example, be curved on its upper and lower surfaces.

In some embodiments according to this disclosure, refractive focusing element 121 is formed from a polymeric matrix and, when cured, has an index of refraction of less than 1.5. Examples of materials for use in such polymeric matrices, and which have an index of refraction of 1.5 or less include, without limitation, isodecyl acrylate, dipropylene glycol diacrylate, tripropylene glycol diacrylate, polyester tetraacrylate, trimethylolpropane triacrylate, and hexanediol diacrylate. Further examples of materials suitable for forming refractive focusing element 121 include substantially transparent or clear, colored or colorless polymers such as acrylics, acrylated polyesters, acrylated urethanes, epoxies, polycarbonates, polypropylenes, polyesters and urethanes. Still further examples of materials which can be used to form a matrix to form refractive focusing element 121 include, without limitation, acrylate monomers, acrylate oligomers, O-phenlyphenoxyethyl acrylate, phenylthioethyl acrylate, bis-phenylthioethyl acrylate, cumyl phenoxyl ethyl acrylate, a biphenylmethyl acrylate, bisphenol A epoxy acrylates, fluorene-type acrylates, brominated acrylates, halogenated acrylates, melamine acrylates and combinations thereof. According to certain embodiments, the composition of the matrix used to form refractive focusing element 121 is specifically formulated to not include materials with a polarizing element, such as iodine, bromine, chlorine or sulfur. As used in this disclosure, the term "polarizing element" encompasses elements whose polarizability is greater than that of carbon.

In various embodiments according to this disclosure, the index of refraction of the material comprising refractive focusing element 121 can be tuned, or adjusted, by adding, or adjusting the concentration of nanoparticles in the material mixture (for example, a polymeric matrix) used to form refractive focusing element 121. According to some embodiments, the index of refraction of the material comprising refractive focusing element can be adjusted by adding, for example, inorganic nanoparticles with a particle diameter of 100 nm or less to the mixture. Examples of inorganic nanoparticles which can be added to a material mixture include, without limitation, aluminum oxide, zirconium dioxide, titanium dioxide, zinc sulfide or zinc telluride nanoparticles. According to certain embodiments, the addition of nanoparticles to the material mixture can raise the index of refraction of the material mixture used to form refractive focusing element 121 from below 1.5, to above 1.7. In some embodiments, indices of refraction above 1.7 are possible through the addition of nanoparticles to an organic resin.

Referring to the non-limiting example of FIG. 1A, in various embodiments according to this disclosure, micro-optic security device 100 further comprises a sealing layer 125. According to various embodiments, sealing layer 125 comprises a smooth, or substantially planar top surface 127 and a non-planar bottom surface 129 which provides a substantially continuous, non-planar boundary between sealing layer 125 and arrangement of refractive image icon focusing elements 120. According to some embodiments, sealing layer 125 has a non-planar top surface which has fewer "pockets" than the boundary between sealing layer 125 and arrangement of refractive image icon focusing elements 120.

In certain embodiments, sealing layer 125 contributes to the robustness and durability of micro-optic security device 100 by protecting the one or more arrangements of refractive image icon focusing elements 120, and eliminating spaces in which dirt, grease and other contaminants associated with use and circulation of security documents from accumulating in the spaces between refractive focusing elements (for example, refractive focusing element 121). Additionally in certain embodiments, sealing layer 125 permits the use of additional layers of material, such as top side adhesives, without significantly affecting the focal length of the system.

According to various embodiments, sealing layer 125 contacts the refractive focusing elements of an arrangement of refractive image icon focusing elements (for example, arrangement of refractive image icon focusing elements 120, along a non-planar boundary at least partially defined by lower surface 129 of sealing layer 125. In certain embodiments, sealing layer 125 is formed from a material having an index of refraction which is different from the index of refraction of the material used to create refractive focusing element 121.

In various embodiments, sealing layer 125 is formed from a polymeric matrix and, when cured, has an index of refraction of less than 1.5. Examples of materials for use in such polymeric matrices include, and which have an index of refraction of 1.5 or less include, without limitation, isodecyl acrylate, dipropylene glycol diacrylate, tripropylene glycol diacrylate, polyester tetraacrylate, trimethylolpropane triacrylate, and hexanediol diacrylate. Further examples of materials suitable for forming sealing layer 125 include substantially transparent or clear, colored or colorless polymers such as acrylics, acrylated polyesters, acrylated urethanes, epoxies, polycarbonates, polypropylenes, polyesters and urethanes. Still further examples of materials which can be used to form a matrix to form sealing layer 125 include, without limitation, acrylate monomers, acrylate oligomers, O-phenlyphenoxyethyl acrylate, phenylthioethyl acrylate, bis-phenylthioethyl acrylate, cumyl phenoxyl ethyl acrylate, a biphenylmethyl acrylate, bisphenol A epoxy acrylates, fluorene-type acrylates, brominated acrylates, halogenated acrylates, melamine acrylates and combinations thereof. According to certain embodiments, the composition of the matrix used to form sealing layer 125 is specifically formulated to not include materials with a polarizing element, such as iodine, bromine, chlorine or sulfur.

According to certain embodiments, sealing layer 125 can be formed from materials producing a high difference (for example, a difference greater than 0.1) in refractive index between sealing layer 125 and the one or more arrangements of refractive image icon focusing elements 120. According to certain embodiments, low-RI materials suitable for use in sealing layer 125 include materials having an RI between 1.3 and 1.4, or materials having an RI less than 1.3. Examples of suitable low RI materials include, without limitation, blends of fluorinated acrylates and fluorinated urethane acrylates, which have been measured as having refractive indices in the 1.3-1.135 range. Further examples of suitable low RI materials include, without limitation, certain perfluoropolyether compounds, such as perfluoropolyether caprolactone diacrylates.

In various embodiments according to this disclosure, the index of refraction of the material comprising sealing layer 125 can be tuned, or adjusted, by adding, or adjusting the concentration of nanoparticles in the material mixture (for example, a polymeric matrix) used to form sealing layer 125. According to some embodiments, the index of refraction of the material comprising refractive focusing element can be adjusted by adding, for example, inorganic nanoparticles with a particle diameter of 100 nm or less to the mixture. Examples of inorganic nanoparticles which can be added to a material mixture include, without limitation, aluminum oxide, zirconium dioxide, titanium dioxide, zinc sulfide or zinc telluride nanoparticles. According to certain embodiments, the addition of nanoparticles to the material mixture can raise the index of refraction of the material mixture used to form sealing layer 125 from below 1.5, to above 1.7. In some embodiments, indices of refraction above 1.7 are possible through the addition of nanoparticles to an organic resin. Depending on the relative values of the index of refraction between sealing layer 125 and the one or more arrangements of refractive image icon focusing elements 120, the shape of the interface between these two layers may have either a convex or concave geometry. For example, and as shown in the illustrative example of FIG. 1A, where the material forming the one or more arrangements of refractive focusing elements 120 has a higher index of refraction relative to the material forming the sealing layer 125, the refracting focusing elements will have a convex geometry. Similarly, where sealing layer 125 is formed of a material having a higher index of refraction than the one or more arrangements of refractive image icon focusing elements 120, the refracting focusing elements will have a concave geometry.

While, in the non-limiting example of FIG. 1A, micro-optic security device 100 is shown as incorporating a sealing layer 125, embodiments according to this disclosure are not so limited, and embodiments without sealing layer 125 are within the contemplated scope of this disclosure.

FIG. 1B illustrates a further non-limiting example of a micro-optic security device 100 according to various embodiments of this disclosure. Referring to the non-limiting example of FIG. 1B, according to some embodiments, micro-optic security device 100 comprises an unsealed (for example, sealing layer 125 is omitted) system in which nanoparticles 117 are incorporated into the matrix used for creating optical spacer 115. According to some embodiments, by adjusting the concentration of nanoparticles 117 in the matrix used to create optical spacer 115, certain optical properties (for example, the F # and effective focal length of refractive focusing element 121 can be tuned).

FIG. 1C illustrates a further example of a micro-optic security device 100, according to various embodiments of this disclosure. As illustrated in the non-limiting example of FIG. 1C, according to certain embodiments, the index of refraction of the material comprising seal layer 125 may be greater than the index of refraction of the material comprising one or more arrangements of refractive image icon focusing elements 120. According to certain embodiments, depending on the relative proportions of the refractive indices of seal layer 125 and the one or more arrangements of refractive image icon focusing elements have a concave or plano-concave lens profile, as depicted in FIG. 1C.

FIGS. 2A-2D illustrate aspects of tuning optical characteristics of refractive image icon focusing elements according to various embodiments of this disclosure.

As discussed elsewhere in this disclosure, in many instances, the design and manufacture of micro-optic security devices involves negotiating trade-offs between realizing desired end-product products and constraints imposed by manufacturing materials and the action of the laws of physics on the materials chosen. As one example, limited manufacturing tolerances for creating refractive focusing elements and image icon layers can impose limits on the precision with which a refractive focusing element is properly focused on an image icon. As a further example, manufacturing tolerances can impose limitations on the amount of visual information (for example, details within a single synthetic image, or distinct synthetic images) which can be placed in the focal area beneath a refractive focusing element. In systems where the index of refraction of the material used to construct the refractive focusing element is fixed, the laws of physics require that, to increase the size of the design space (for example, a region of an image icon layer in which image icons and graphic information can be provided) beneath the refractive focusing element, the thickness of the focusing element must be increased. For many end products (for example, banknotes), increasing the thickness of the focusing layer is undesirable, as thicker notes may be more susceptible to damage or getting stuck in processing machinery (for example, bill acceptors on vending machines).

As discussed with reference to the non-limiting examples of FIGS. 2A-2D, certain embodiments according to this disclosure allow designers and manufacturers of micro-optic security devices to treat the index of refraction of one or more components of a micro-optic security device as a tunable parameter, thereby reducing the extent to which designers and manufacturers of micro-optic security devices are required to accept trade-offs between one desired performance characteristic (for example, device thickness) to achieve another desired performance characteristic (for example, an increase in visual information under a refractive focusing element).

Figure 2A:
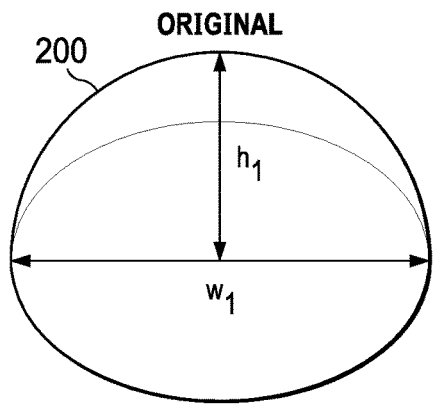
FIGS. 2A-2D illustrate aspects of tuning optical characteristics of refractive image icon focusing elements according to various embodiments of this disclosure.
Figure 2B:
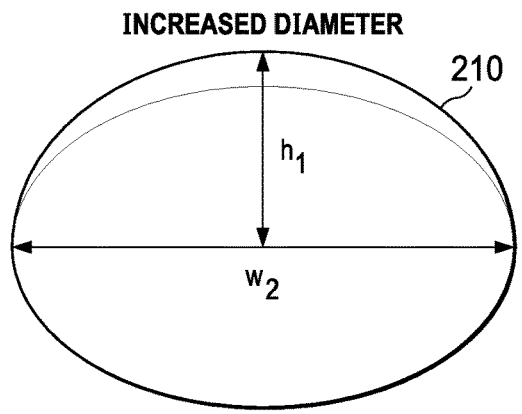
Figure 2C:
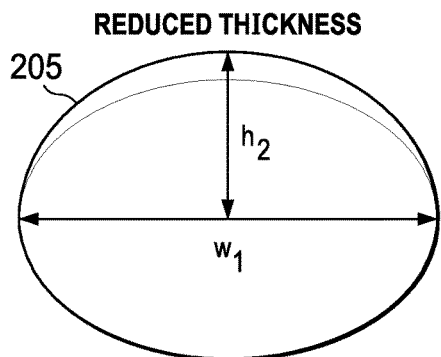
Figure 2D:
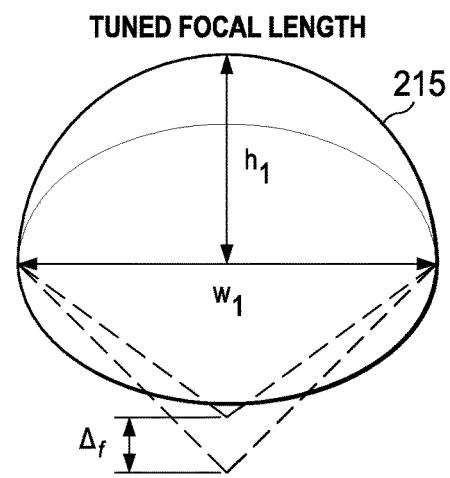

Referring to the non-limiting example of FIG. 2A, a refractive focusing element 200 having a height h1 and width w1, is shown. According to certain embodiments, refractive focusing element 200 is formed from a material comprising, at a minimum, an organic resin. In some embodiments, the organic resin has an index of refraction of less than 1.5. In various embodiments, the index of refraction of refractive focusing element can be increased by adding nanoparticles to a polymeric matrix used to create refractive focusing element 200.

According to some embodiments, increasing the index of refraction of refractive focusing element 200 can facilitate the realization of one or more desired end-product properties without a trade-off with other desired end-product properties. For example, adding nanoparticles to increase the index of refraction of a refractive focusing element can produce a thinner focusing element with the same focal length. For example, refractive focusing element 205 has the same width ($w_1$) and focal length as refractive focusing element 200, but a reduced thickness ($h_2 < h_1$).

In certain embodiments, increasing the index of refraction of a refractive focusing element 200 can catalyze an increase in the available area under the refractive focusing element, thereby allowing more visual information to be provided under a refractive focusing element without requiring an increase in the focusing element's thickness, or manufacturing tolerances for encoding visual information (for example, by creating arrangements of image icons). For example, refractive focusing element 210, to which nanoparticles have been added to a polymeric matrix for forming the refractive focusing element, has a higher index of refraction. In this non-limiting example, refractive focusing element 210 has the same thickness and focal length, but a larger diameter ($w_2 > w_1$) than refractive focusing element 200, thereby allowing more visual information to be encoded underneath refractive focusing element 210 than refractive focusing element 200.

In many micro-optic security devices, imperfect focus (i.e., when the focal length of a refractive focusing element does not coincide with the depth of an image icon at wavelength(s) of interest) corresponds to poor contrast in synthetic images provided by the micro-optic security device. According to certain embodiments, the focal length (f) of a refractive focusing element 215 having the same width and diameter as refractive focusing element 200 can be tuned across a range of lengths ($\Delta f$) by changing the concentration of nanoparticles in the material mixture used to create refractive focusing element 215. For example, increasing the concentration of nanoparticles in the material mixture corresponds to an increase in the index of refraction of refractive focusing element 215, thereby decreasing the focal length of refractive focusing element 215. Similarly, decreasing the concentration of nanoparticles in a material mixture corresponds to a decrease in the index of refraction of refractive focusing element 215, thereby increasing the focal length of refractive focusing element 215.

While the non-limiting example of FIGS. 2A-2D describe optical tuning of a refractive focusing element by adjusting the concentration of nanoparticles in a material mixture, embodiments according to this disclosure are not so limited. The properties of components of a micro-optic security device, such as a sealing layer (for example, sealing layer 125 in FIG. 1A), an optical spacer (for example, optical spacer 115 in FIG. 1A), or a retaining structure for an arrangement of image icons (for example, retaining structure 114 in FIG. 1A) can also be tuned by varying a concentration of nanoparticles in a material mixture to change the index of refraction of the components.

While the illustrative examples of FIGS. 2A-2D have been described with reference to a convex/plano-convex lens, embodiments according to this disclosure are not so limited, and optical tuning with nanoparticles is possible in lenses of other shapes (for example, convex lenses or plano-convex lenses).

Figure 3:
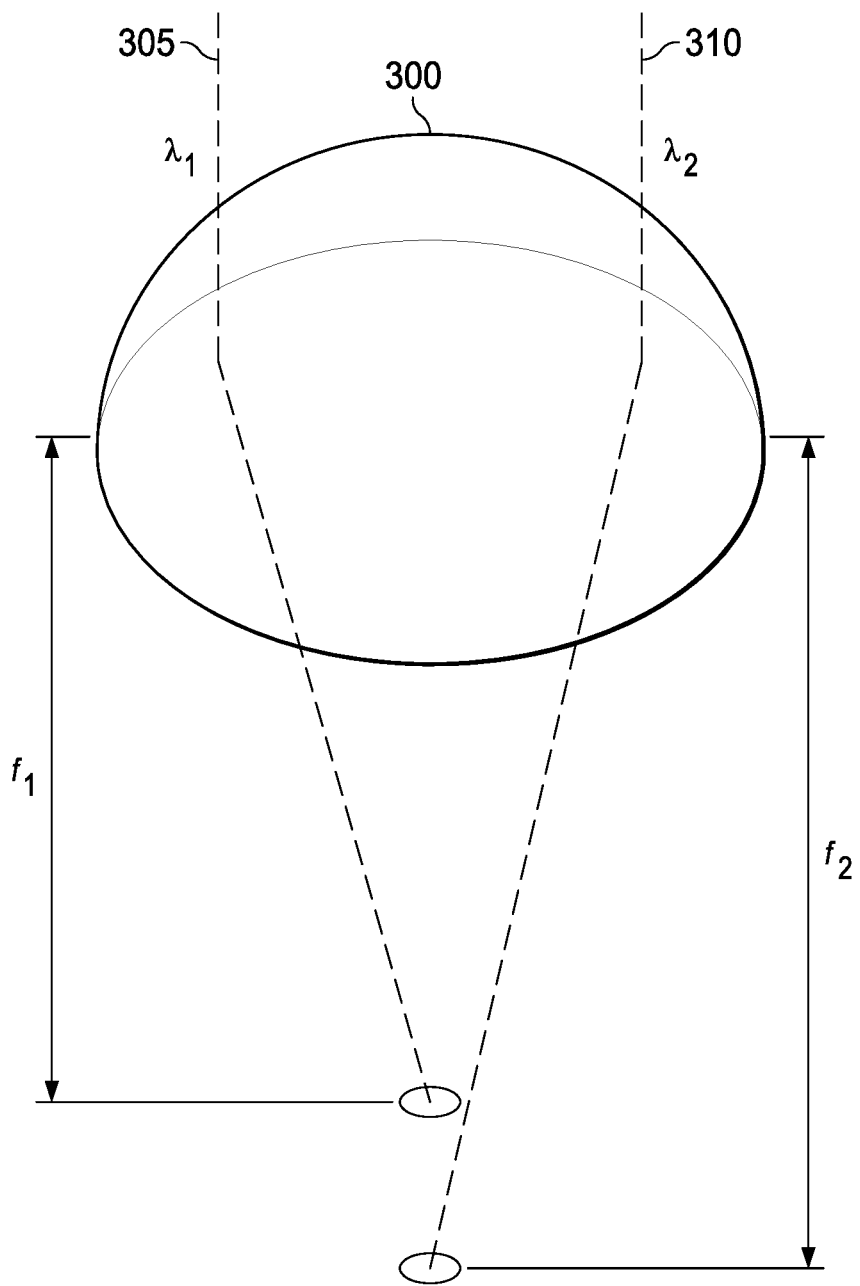
FIG. 3 illustrates aspects of chromatic aberration associated with the passage of light of different wavelengths through a refractive image icon focusing element.

FIG. 3 illustrates aspects of chromatic aberration associated with the passage of light of different wavelengths through a refractive image icon focusing element.

Referring to the illustrative example of FIG. 3, a refractive focusing element 300 suitable for use in a micro-optic security device (for example, micro-optic security device 100 in FIG. 1A) is shown. In this illustrative example, refractive focusing element 300 has an index of refraction of approximately 1.5. Further, in the example of FIG. 3, the index of refraction of refractive focusing element 300 can be tuned to higher values through the addition of nanoparticles to the material mixture used to form refractive focusing element 300.

In this example, dispersion effects within refractive focusing element 300 create chromatic aberration, or spherochromaticism, whereby light of different wavelengths focuses at different focal lengths. For example, a first beam of light 305 of a color associated with a wavelength $\lambda 1$ passes through refractive focusing element 300 and is focused at on a point at a focal length f1. Similarly, a second beam of light 310 of a color associated with a longer wavelength $\lambda 2$ (e.g., $\lambda 2 > \lambda 1$) passes through refractive focusing element 300 and is focused on a point at a focal length f2, which is longer than focal length f1.

In the context of a micro-optic security device, the above-described chromatic aberration can have the effect of reducing the contrast between colors of synthetic images produced by the micro-optic system, which end-product users can find undesirable. Additionally, as the index of refraction of refractive focusing element 300 is increased (for example, by adding nanoparticles to the material mixture), the degree of chromatic aberration (e.g., the ratio of f2 to f1) may, depending on changes in dispersion within the matrix, and can become more pronounced. While chromatic aberration can be managed in telescopes and cameras by increasing the overall focal length of the focusing element to bring the focal lengths of different wavelengths closer together, this approach is typically unacceptable in the context of micro-optic security devices and security documents, where thick products are often unusable. Additionally, in certain embodiments, chromatic aberration can be managed through the introduction of a second lens, or a doublet formed from two materials with different dispersive properties.

Figure 4:
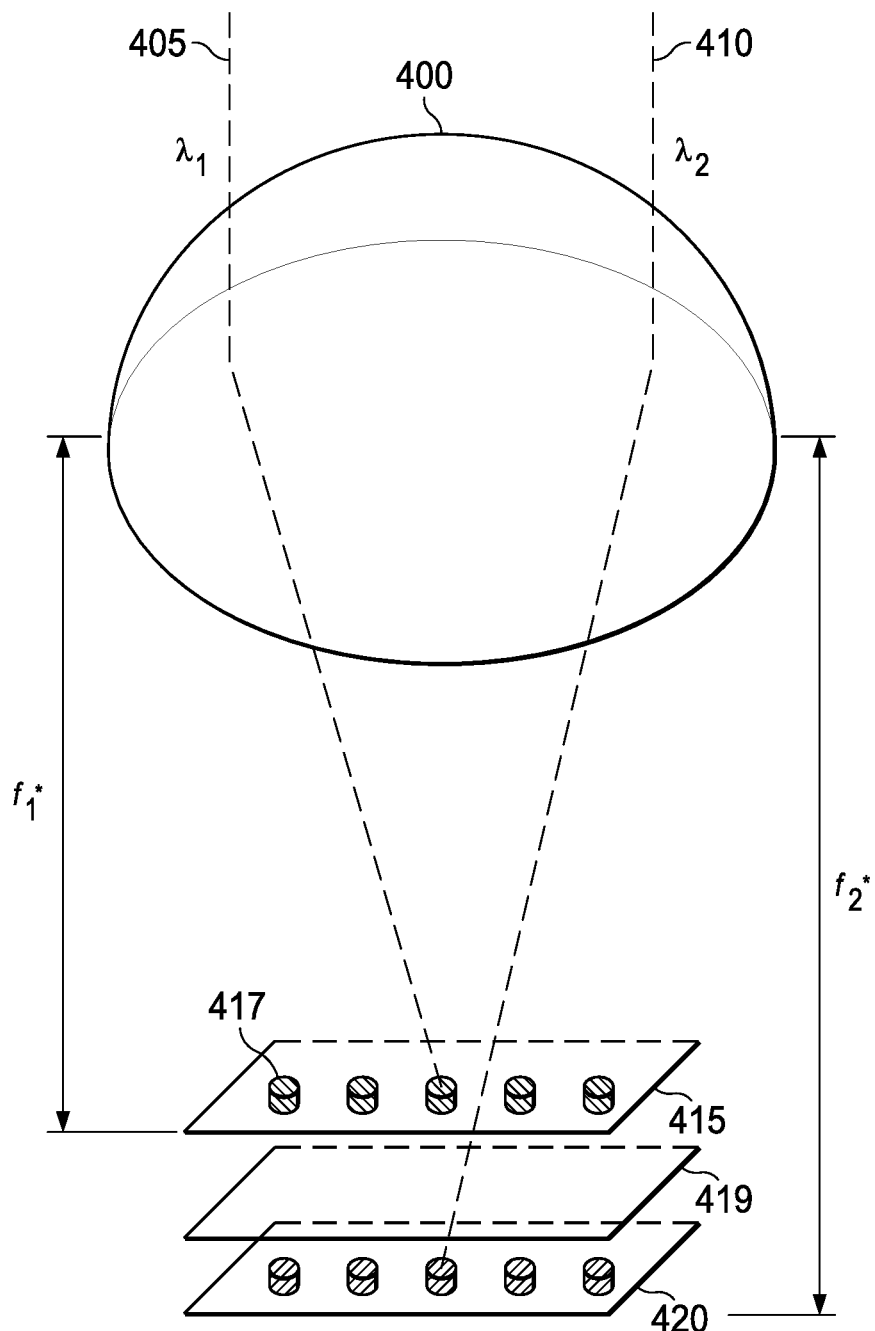
FIG. 4 illustrates an example of multiple arrangements of image icons situated underneath an index tuned refractive image icon focusing element according to some embodiments this disclosure.

FIG. 4 illustrates an example of multiple arrangements of image icons situated underneath a refractive image icon focusing element according to some embodiments of this disclosure. According to certain embodiments of this disclosure, by using nanoparticles to tune the index of refraction of a refractive focusing element and/or other components of a micro-optic security device, the chromatic aberration effects described with reference to FIG. 3 of this disclosure can be mitigated and leveraged to produce synthetic images with surprising visual effects.

Referring to the illustrative example of FIG. 4, a refractive focusing element 400 is shown as focusing a first beam of light 405 at a first wavelength $\lambda 1$ on a first arrangement of image icons 415. According to certain embodiments, first arrangement of image icons 415 includes one or more features (for example, colored region 112 in FIG. 1) of a color associated with a wavelength equal to, within a specified range of wavelengths around first wavelength $\lambda 1$. According to certain embodiments, in addition to refractive focusing element 400, first beam of light passes through other optical components (for example, a spacer layer or a sealing layer) of the micro-optic security device, which, in combination with refractive focusing element 400, have a first effective focal length f1* for light of wavelength $\lambda 1$. According to certain embodiments, the value of f1* can be tuned by adjusting the concentration of nanoparticles in refractive focusing element 400 and other components of the micro-optic security device, such that first beam of light 405 is focused on first arrangement of image icons 415.

As shown in the illustrative example of FIG. 4, refractive focusing element 400 is shown as focusing a second beam of light 410 at a second wavelength $\lambda 2$ on a second arrangement of image icons 420. According to certain embodiments, second arrangement of image icons 420 includes one or more features of a color associated with a wavelength equal to, within a specified range of wavelengths around, second wavelength $\lambda 2$. According to certain embodiments, in addition to refractive focusing element 400, first beam of light passes through other optical components (for example, a spacer layer or a sealing layer) of the micro-optic security device, which, in combination with refractive focusing element 400, have a second effective focal length f2* for light of wavelength $\lambda 2$.

According to some embodiments, because second arrangement of image icons 420 is located below first arrangement of image icons 415, second beam of light 410 passes through additional structures 419 (for example, spacer layers or retaining structures) of the micro-optic security device. According to certain embodiments, the value of f2* can be tuned to ensure that second beam of light 410 is focused on second arrangement of image icons 420 by, for example, adjusting the concentration of nanoparticles in refractive focusing element 400 as well as additional structures 419.

Figure 5:
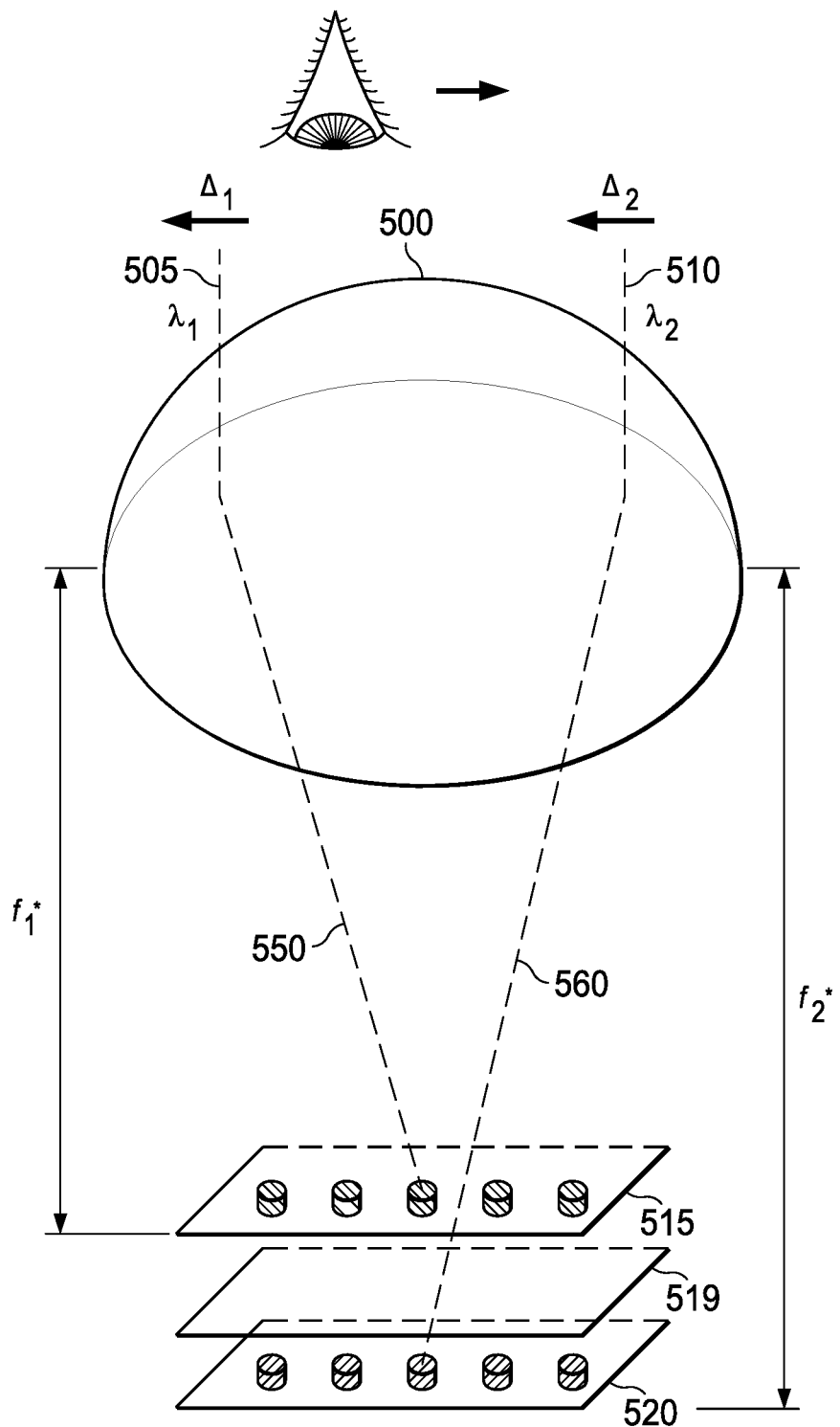
FIG. 5 illustrates aspects of visual effects in a synthetic image created by a micro-optic security device according to certain embodiments of this disclosure.
Figure 6A:
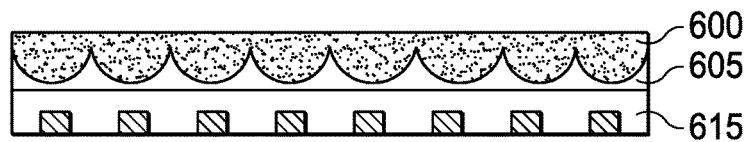
FIGS. 6A-6E illustrate examples of configurations of micro-optic security devices with a nanoparticle tuned sealing layer according to various embodiments of this disclosure.
Figure 6B:
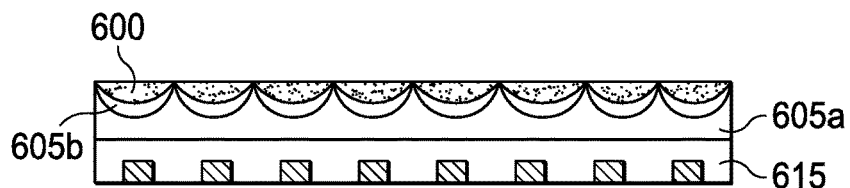
Figure 6C:
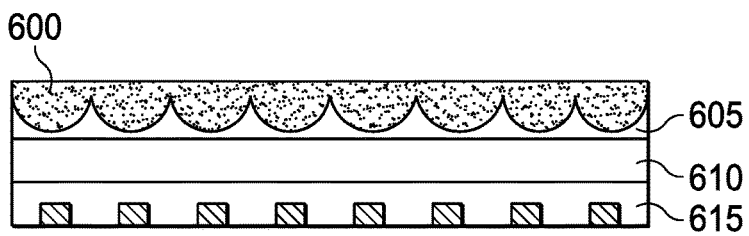
Figure 6D:
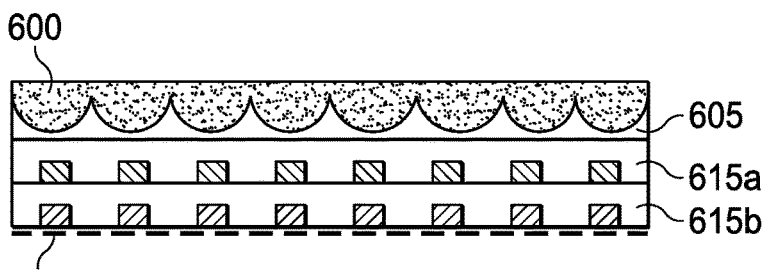
Figure 6E:
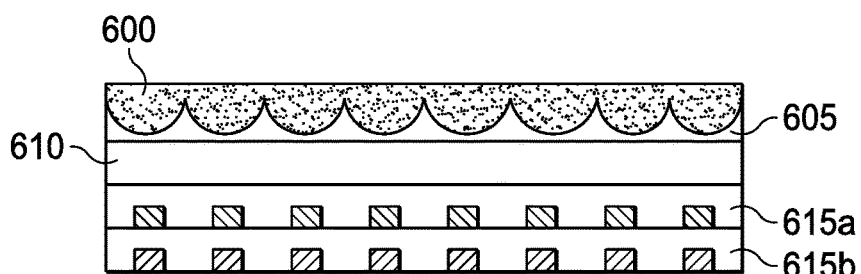
Figure 7A:
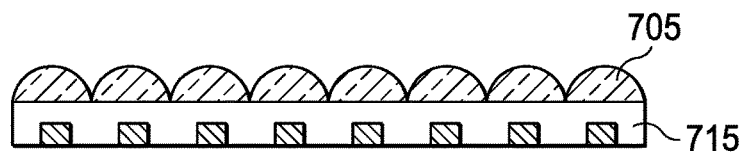
FIGS. 7A-7E illustrate examples of configurations of micro-optic security devices with nanoparticle tuned refractive image icon focusing elements according to certain embodiments of this disclosure.
Figure 7B:
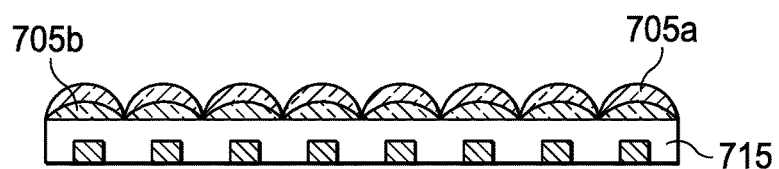
Figure 7C:
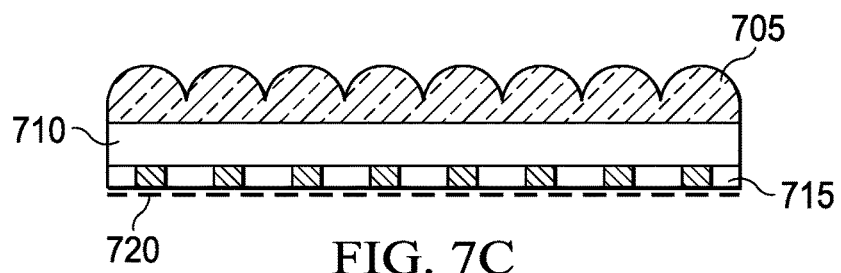
Figure 7D:
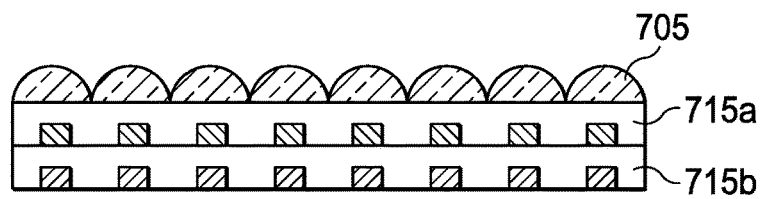
Figure 7E:
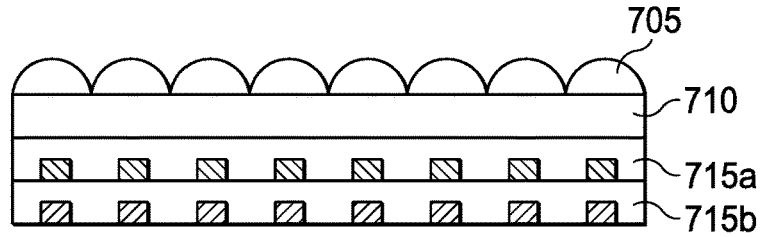

FIG. 5 illustrates aspects of visual effects in a synthetic image created by micro-optic security device according to certain embodiments of this disclosure.

Referring to the non-limiting example of FIG. 5, a refractive focusing element 500 is shown as focusing a first beam of light 505 of a color (for example, blue) associated with a wavelength $\lambda 1$, through components of a micro-optic security device such that it focuses on a first arrangement of image icons 515 at an effective focal length f1* for light of wavelength $\lambda 1$. Similarly, in this explanatory example, refractive focusing element is shown as focusing a second beam of light 510 of a color (for example, red) associated with a longer wavelength $\lambda 2$, through components (including additional components 519) of the micro-optic security device, such that it focuses second beam of light on a second arrangement of image icons 520 at an effective focal length f2* for light of wavelength $\lambda 2$.

Referring to the non-limiting example of FIG. 5, the effective focal length f1* for light of wavelength $\lambda 1$ is less than the effective focal length f2* for light of wavelength $\lambda 2$. According to various embodiments, the above-described difference in effective focal length between f1* and f2* implies a wavelength-based difference in F number. Put differently, features of first arrangement of image icons 515 of a first characteristic color associated with wavelength $\lambda 1$ form components of a first characteristic color of a synthetic image projected by the micro-optic system. Similarly, features of second arrangement of image icons 520 of a second characteristic color associated with wavelength $\lambda 2$ form components of a second characteristic color of the synthetic image projected by the micro-optic system.

Due to the difference in the effective focal length f1* for light of wavelength $\lambda 1$ and the effective focal length f2* for light of wavelength $\lambda 2$, image icons whose characteristic color is associated with light of wavelength $\lambda 1$ are formed in a first arrangement of image icons 515 which is on a different layer than a second arrangement of image icons 520 comprising image icons whose characteristic color is associated with light of wavelength $\lambda 2$. All other factors being equal (for example, both arrangements of image icons are providing similar optical effects), the above described difference in layer height between first arrangement of image icons 515 and second arrangement of image icons causes components of a synthetic image created by the micro-optic security of the first characteristic color to exhibit a smaller change in position ($\Delta 1$) than the change in position ($\Delta 2$) of components of the second characteristic color in response to a shift in viewing position. That is, in the non-limiting example of FIG. 5, the red components of the synthetic image will appear to move further and faster in response to changes in viewing position than the blue components of the synthetic image (i.e., $\Delta 2 > \Delta 1$). Put differently, the synthetic image from first arrangement of image icons 515 has the appearance of being on a short "lever arm" 550 as compared to a longer "lever arm" 560 for the long wavelength components of the synthetic image from second arrangement of image icons 520. Thus, when a viewer adjusts a viewing angle of the micro-optic security device, the long wavelength components of the synthetic image (for example, the red portions) on second arrangement of image icons 520 appear to move faster than the short wavelength components of the synthetic image (for example, the blue portions) on first arrangement of image icons 515. According to certain embodiments, the relative "speed" of different colored components of a synthetic image can be indicia of the authenticity of a security feature.

While the non-limiting examples of FIGS. 3-5 illustrate aspects of optical effects produced by micro-optic systems according to certain embodiments incorporating lenses depicted as convex or plano-convex, embodiments according to this disclosure are not limited thereto, and the examples of FIGS. 3-5 are applicable across embodiments using multiple lens geometries, including, without limitation, concave or plano-concave lenses.

FIGS. 6A-6E illustrate five examples, designated a.)-e.) of configurations of micro-optic security devices with a nanoparticle tuned sealing layer according to various embodiments of this disclosure. While certain embodiments are described with reference to the five embodiments shown in the illustrative example of FIGS. 6A-6E, the present disclosure is not so limited, and further configurations of micro-optic security devices with nanoparticle-tuned sealing layers are possible and within the contemplated scope of this disclosure.

Referring to the non-limiting example of FIGS. 6A-6E, certain micro-optic security devices according to this disclosure include a nanoparticle-tuned sealing layer 600. In some embodiments, nanoparticle-tuned sealing layer 600 comprises the topmost (relative to an intended viewing position) layer of a micro-optic security device and has a substantially planar top surface to resist accumulation of dirt, grease and other degradants of the micro-optic security device's ability to generate a synthetic image. According to various embodiments, nanoparticle-tuned sealing layer 600 is constructed from a material mixture which includes an organic resin (for example, an acrylate monomer or acrylate oligomer) and one or more nanoparticles, whose concentration in the material mixture adjusts the index of refraction of the nanoparticle-tuned sealing layer 600. In some embodiments, the concentration of nanoparticles is selected to achieve a predetermined difference in refractive index between nanoparticle-tuned sealing layer 600 and one or more arrangements of refractive image icon focusing elements 605, along a non-planar boundary between nanoparticle-tuned sealing layer 600 and one or more arrangements of refractive image icon focusing elements 605. In the non-limiting examples shown in FIGS. 6A-6E, nanoparticle-tuned sealing layer 600 is constructed of a material having a higher index of refraction than refractive image icon focusing elements 605, and as a result, refractive image icon focusing elements 605 have a concave lens geometry. Other embodiments according to this disclosure, wherein the difference between the RI of sealing layer 600 and refractive image icon focusing elements 605 necessitates a convex lens geometry, are possible, and within the contemplated scope of the present disclosure.

As shown in the illustrative example of FIGS. 6A-6E, micro-optic security devices according to certain embodiments of this disclosure can include one or more arrangements of refractive image icon focusing elements 605. According to certain embodiments, the one or more arrangements of refractive image icon focusing elements comprise a set of structures which define one or more non-planar boundaries between regions of different indices of refraction, and focus light of at least one wavelength on image icons in the one or more arrangements of image icons 615. In some embodiments, the refractive focusing elements of the one or more arrangements of refractive image icon focusing elements 605 are radially symmetric. In certain embodiments, the refractive focusing elements are axially or translationally symmetric (for example, lenticles of a lenticular array). In some embodiments, the one or more arrangements of refractive image icon focusing elements comprise two or more arrangements of refractive image icon focusing elements (for example, 605a and 605b). In certain embodiments, the use of multiple arrangements of refractive image icon focusing elements may be desirable for internal reflections, chromatic aberrations, or other unwanted visual effects. According to various embodiments, the refractive focusing elements the one or more arrangements of refractive image icon focusing elements 605 have diameters of 30 μm or greater. In various embodiments, the refractive image icon focusing elements 605 between 7.5 to 25 μm.

In various embodiments according to this disclosure, micro-optic security devices with nanoparticle-tuned sealing layers include an optical spacer 610. According to some embodiments, optical spacer 610 can be a sheet of material upon which materials for forming other elements of the micro-optic security device are applied and formed. In some embodiments, optical spacer 610 is integrated with another component (for example, an arrangement of refractive image icon focusing elements) of the micro-optic security device. In certain embodiments, and depending on, for example, the difference of indices of refraction along the non-planar boundary between a sealing layer and an arrangement of refractive image icon focusing elements, optical spacer 610 serves to position one or more arrangements of image icons at a focal length of an arrangement of refractive image icon focusing elements.

As shown in the non-limiting example of FIGS. 6A-6E, micro-optic security devices according to certain embodiments of this disclosure include one or more arrangements of image icons 615, which are disposed beneath (relative to an intended viewpoint) the one or more arrangements of refractive image icon focusing elements, such that a portion of the one or more refractive image icon focusing elements 605 projects a synthetic image of a portion of the one or more arrangements of image icons 615. According to certain embodiments the micro-optic security device has two or more arrangements of image icons (615a and 615b). In certain embodiments, each arrangement of image icons includes features having a characteristic color, and each arrangement of image icons is disposed at a depth, or location within the micro-optic security device, relative to the one or more arrangements of refractive image icon focusing elements associated with a wavelength-dependent effective focal length of the one or more arrangements of refractive image icon focusing elements 605.

In various embodiments according to this disclosure, micro-optic security devices with nanoparticle-tuned sealing layers further comprise a machine-readable security device (Mr-SD) 620. In certain embodiments, Mr-SD 620 comprises a layer of magnetic ink, or another medium, which, when passed through a proprietary device, such as banknote equipment manufacturer (BEM) machine, provide a characteristic emission or response spectrum to closely guarded validation criteria.

According to various embodiments, micro-optic security devices with a nanoparticle-tuned sealing layer 600 have a device thickness of 50 microns or less. As used in this disclosure, the term "device thickness" encompasses a distance from the surface through which light enters the optical device to the surface (as opposed to an adhesive layer) providing an interface between the micro-optic security device and a substrate to which the micro-optic security device is attached.

FIGS. 7A-7E illustrate five examples of configurations of micro-optic security devices which do not include a nanoparticle tuned sealing layer according to various embodiments of this disclosure. While certain embodiments are described with reference to the five embodiments shown in the illustrative examples of FIGS. 7A-7E, the present disclosure is not so limited, and further configurations of micro-optic security devices are possible and within the contemplated scope of this disclosure.

As shown in the illustrative examples of FIGS. 7A-7E, micro-optic security devices according to certain embodiments of this disclosure can include one or more arrangements of refractive image icon focusing elements 705. According to certain embodiments, the one or more arrangements of refractive image icon focusing elements comprise a set of structures which define one or more non-planar boundaries between regions of different indices of refraction, and focus light of at least one wavelength on image icons in the one or more arrangements of image icons 715. In some embodiments, the refractive focusing elements of the one or more arrangements of refractive image icon focusing elements 705 are radially symmetric. In certain embodiments, the refractive focusing elements are axially symmetric (for example, lenticles of a lenticular array). In some embodiments, the one or more arrangements of refractive image icon focusing elements comprise two or more arrangements of refractive image icon focusing elements (for example, 705a and 705b). In certain embodiments, the use of multiple arrangements of refractive image icon focusing elements may be desirable for internal reflections, chromatic aberrations, or other unwanted visual effects. According to various embodiments, the refractive focusing elements the one or more arrangements of refractive image icon focusing elements 705 have diameters of 30 μm or greater. According to various embodiments, the refractive focusing elements are formed from a material mixture which includes an organic resin and nanoparticles, which, in combination have an index of refraction of greater than 1.5 According to some embodiments, the organic resin in the material mixture, by itself, has an index of refraction of less than 1.5. In certain embodiments, the organic resin in the material mixture has an index of refraction of 1.4 or less.

In various embodiments according to this disclosure, micro-optic security devices which omit nanoparticle-tuned sealing layers include an optical spacer 710. According to some embodiments, optical spacer 710 can be a sheet of material (for example, a polyester film) upon which materials for forming other elements of the micro-optic security device are applied and formed. In some embodiments, optical spacer 710 is integrated with another component (for example, an arrangement of refractive image icon focusing elements) of the micro-optic security device. In certain embodiments, and depending on, for example, the difference of indices of refraction along the non-planar boundary between an arrangement of refractive image icon focusing elements and another medium (such as air), optical spacer 710 serves to position one or more arrangements of image icons at a focal length of an arrangement of refractive image icon focusing elements.

As shown in the non-limiting example of FIGS. 7A-7E, micro-optic security devices according to certain embodiments of this disclosure include one or more arrangements of image icons 715, which are disposed beneath (relative to an intended viewpoint) the one or more arrangements of refractive image icon focusing elements, such that a portion of the one or more refractive image icon focusing elements 705 projects a synthetic image of a portion of the one or more arrangements of image icons 715. According to certain embodiments the micro-optic security device has two or more arrangements of image icons (715*a* and 715*b*). In certain embodiments, each arrangement of image icons includes features having a characteristic color, and each arrangement of image icons is disposed at a depth, or location within the micro-optic security device, relative to the one or more arrangements of refractive image icon focusing elements associated with a wavelength-dependent effective focal length of the one or more arrangements of refractive image icon focusing elements 705.

In various embodiments according to this disclosure, micro-optic security devices which do not include nanoparticle-tuned sealing layers further comprise a machine-readable security device (Mr-SD) 720. In certain embodiments, Mr-SD 720 comprises a layer of magnetic ink, or another medium, which, when passed through a proprietary device, such as banknote equipment manufacturer (BEM) machine, provide a characteristic emission or response spectrum to closely guarded validation criteria.

According to various embodiments, micro-optic security devices which do not include a nanoparticle-tuned sealing layer may have a device thickness of 20-30 microns. In some embodiments, micro-optic security devices which do not include a nanoparticle tuned sealing layers have a thickness of 20 microns or less. According to certain embodiments, micro-optic security devices which do not include a nanoparticle-tuned sealing layer may have device thicknesses of less than 15 microns.

Figure 8:
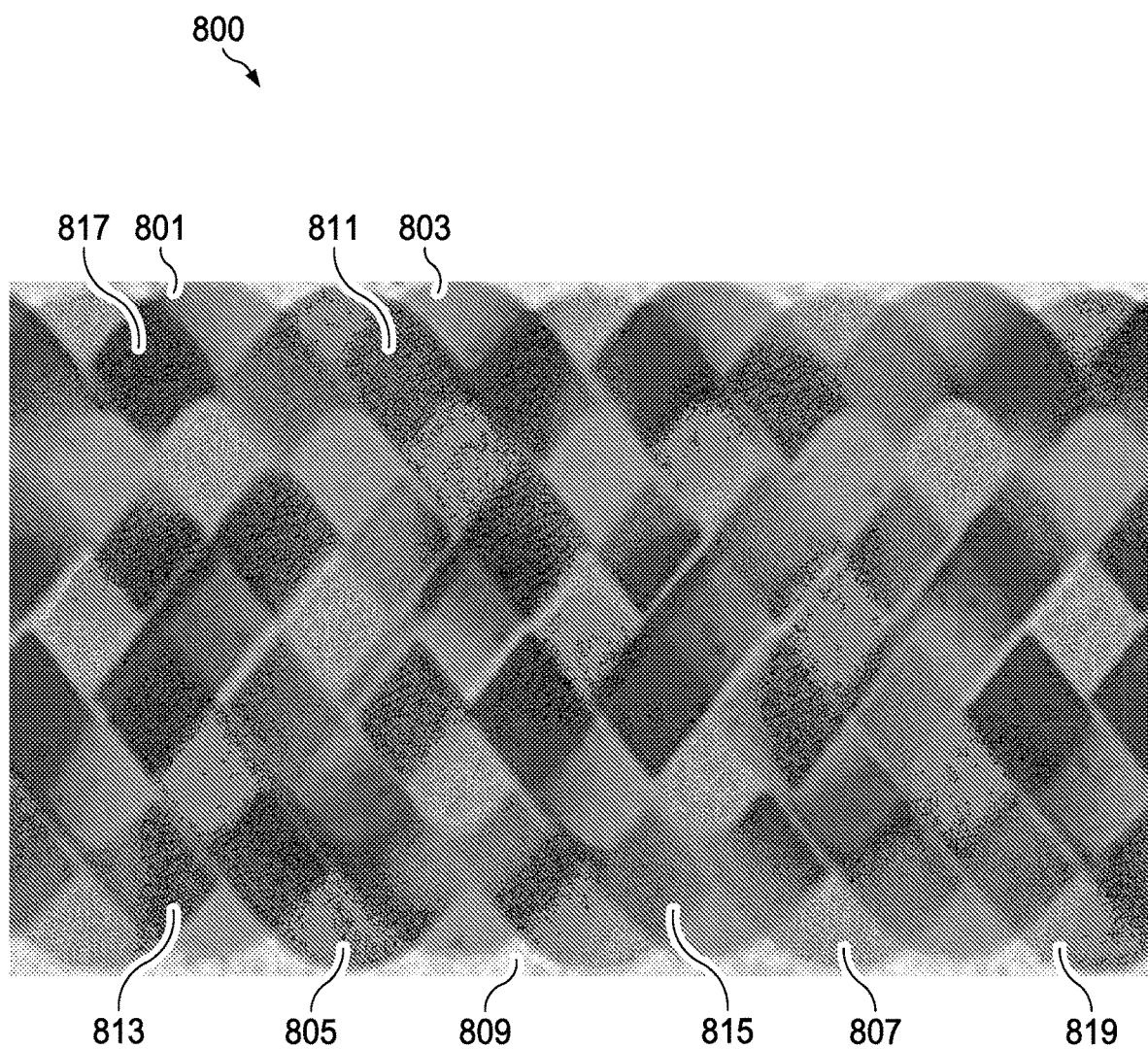
FIG. 8 illustrates an example of a synthetic image comprising permutations of characteristic colors of a first arrangement of image icons associated with a first characteristic color and a second arrangement of image icons of a second characteristic color according to various embodiments of this disclosure.

FIG. 8 illustrates an example of a synthetic image 800 comprising permutations of characteristic colors of a first arrangement of image icons associated with a first characteristic color and a second arrangement of image icons of a second characteristic color according to various embodiments of this disclosure.

Referring to the non-limiting example of FIG. 8, a synthetic image provided by a micro-optic security device (for example, micro-optic security device 100 in FIG. 1) as it appears at a first viewing angle is represented in the figure. According to certain embodiments, the micro-optic security device projecting synthetic image 800 comprises an arrangement of nanoparticle tuned refractive image icon focusing elements (for example, arrangement of refractive image icon focusing elements 120 in FIG. 1A), wherein the index of refraction of the focusing elements has been tuned to focus light of a first wavelength on a first layer comprising an arrangement of image icons (for example, arrangement of image icons 110*b* in FIG. 1) associated with a first characteristic color. In this illustrative example, the first characteristic color is blue, though embodiments with a different first characteristic color are possible and within the scope of this disclosure. Similarly, the index of refraction of the focusing elements of the micro-optic security device providing the synthetic image illustrated in FIG. 8 are tuned to also focus light of a second wavelength on a second layer comprising a second arrangement of image icons (for example, arrangement of image icons 110*a* in FIG. 1) associated with a second characteristic color. In this illustrative example, the second characteristic color is magenta, though embodiments with a different second characteristic color are possible and within the scope of this disclosure. Further, according to some embodiments, the image icon layers of the micro-optic security device projecting synthetic image 800 include regions between image icons which are substantially colorless (for example, regions of clear material defining structures retaining the image icons).

As shown in FIG. 8, the synthetic image 800 provided at a first viewing angle comprises shades, or permutations, made from the first characteristic color, the second characteristic color and the colorless regions. For example, synthetic image 800 comprises region 801, which is blue in the same shade of blue as the first characteristic color. Similarly, synthetic image 800 comprises region 803, which is of a blue which is a lighter shade of blue than the first characteristic color. Additionally, synthetic image 800 comprises region 805 which is magenta in the same shade of magenta as the second characteristic color. Further, synthetic image 800 comprises region 807 which is magenta in a lighter shade of magenta than the second characteristic color. Still further, synthetic image 800 comprises region 809, which, like certain interstitial regions within the layers of image icons, is substantially colorless. Additionally, synthetic image 800 comprises region 811, which is a shade of purple associated with a mixture of the first characteristic color and the second characteristic color. As shown in the non-limiting example of FIG. 8, synthetic image 800 comprises region 813 which is a shade of purple associated with the second characteristic color and the lighter shade of the first characteristic color (for example, the lighter shade of blue in region 803). Similarly, synthetic image 800 comprises region 815, which is a shade of purple associated with the lighter shade of the first characteristic color (for example, the lighter shade of blue in region 803), and the lighter shade of the second characteristic color (for example, the lighter shade of magenta in region 807). Finally, in certain embodiments, synthetic image 800 comprises region 817, which is a shade of purple associated with the first characteristic color and a lighter shade of the second characteristic color (for example, the lighter shade of magenta in region 807).

Thus, certain embodiments according to this disclosure provide the unexpected result of a two-color icon structure which allows a single focusing element to contribute at least nine colors to a synthetic image provided by a micro-optic system of which the icon structure and focusing element are part. More generally, in certain embodiments according to this disclosure, synthetic images provided by the security device across a first range of viewing angles can comprise at least nine colors, through modulation of the positions of image icons associated with a first characteristic color and image icons associated with a second characteristic color within two layers of image icons.

Additionally, in certain embodiments, further colors beyond the at least nine colors provided by a single focusing element projecting light from a two or more layer image icon structure can be achieved by aggregating the outputs of multiple focusing elements in which the color output has been modulated according to various embodiments of this disclosure. As a non-limiting example, consider a region of a micro-optic security device (for example, micro-optic security device 100) comprising micro-optic cells, each of which can output at least nine colors by modulating the position and presence of image icons within two layers of the image icon structure. As used in this disclosure, the term "micro-optic cell" encompasses a three dimensional section of a micro-optic security device corresponding to a single focusing element, such as shown in FIG. 4 of this disclosure. By configuring a first fraction (for example, one third) of the micro-optic cells to output one of at least nine colors (for example, the lighter shade of magenta in region 807 in FIG. 8) attainable with two layers of an icon structure, and a second fraction of the micro-optic cells to output another of the at least nine colors (for example, the magenta shown in region 805 of FIG. 8), the micro-optic cell region will appear as a region of a color which is a mixture of the colors output by the first and second fractions of the micro-optic cells in the region. Thus, according to certain embodiments, extremely granular control of the colors provided by a micro-optic security system can be achieved by interspersing cells outputting different colors of the at least nine colors output by each micro-optic cell.

Figure 9A:
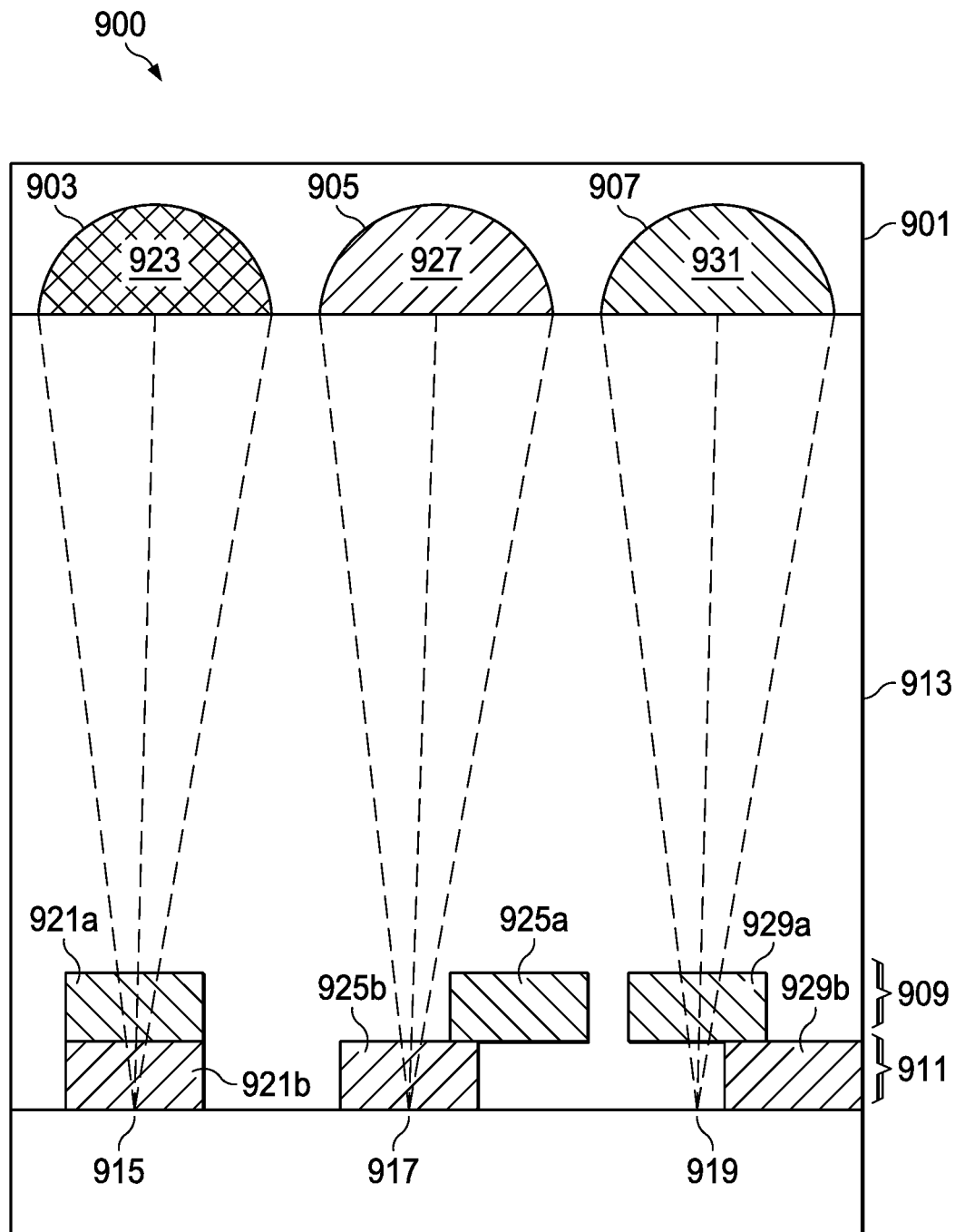
FIGS. 9A, 9B and 9C illustrate aspects of generating synthetic images comprising permutations of characteristic colors of a first arrangement of image icons associated with a first characteristic color and a second arrangement of image icons associated with a second characteristic color.
Figure 9B:
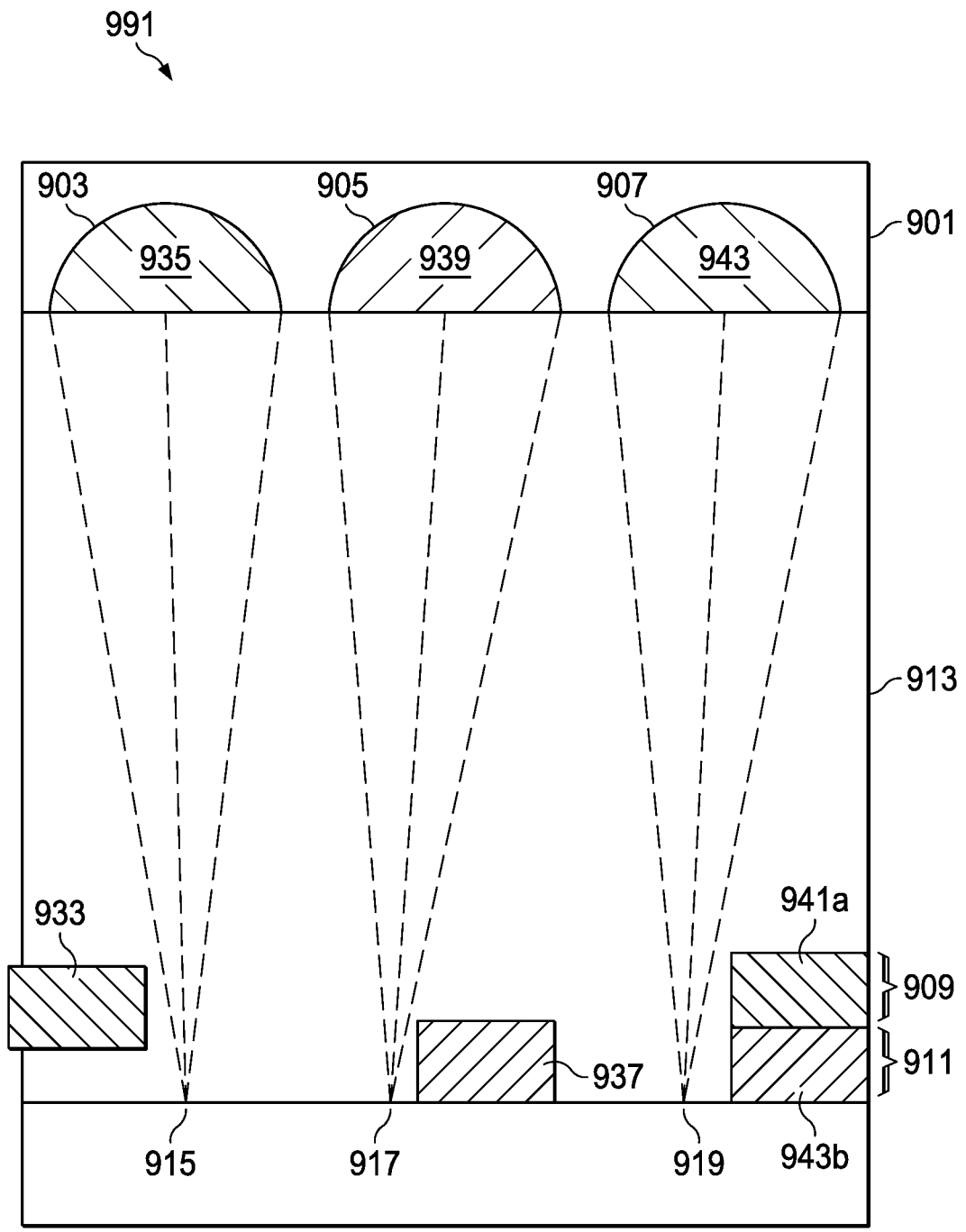
Figure 9C:
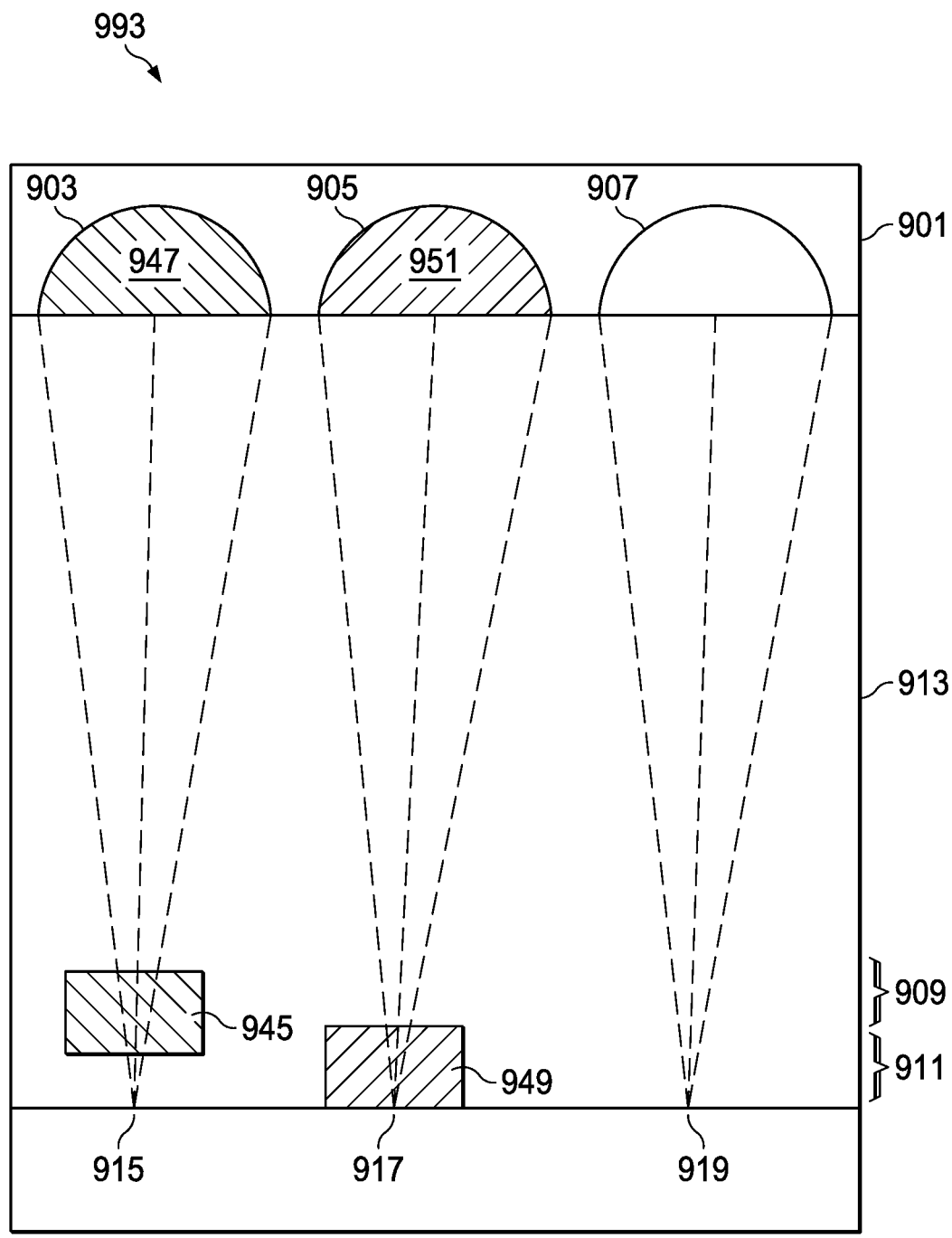

FIGS. 9A, 9B and 9C illustrate aspects of generating synthetic images comprising permutations of characteristic colors of a first arrangement of image icons associated with a first characteristic color and a second arrangement of image icons associated with a second characteristic color.

Referring to the non-limiting examples of FIGS. 9A, 9B and 9C, in certain embodiments, permutations of a set of characteristic colors of image icons can be achieved by modulating the position of image icons relative to the focal point of image icons and colorless regions within an image icon layer.

Referring to the non-limiting example of FIG. 9A, a first subsection 900 of a micro-optic security device (for example, micro-optic security device 100 in FIG. 1) is shown. According to certain embodiments, the micro-optic security device comprises a sealing layer 901 (for example, sealing layer 125 in FIG. 1), a plurality of focusing elements, including focusing elements 903, 905 and 907, and an optical spacer 913 (for example, optical spacer 115 in FIG. 1). In some embodiments according to this disclosure, one or more of sealing layer 901, focusing elements 903, 905 and 907, or optical spacer 913 are constructed from a polymeric matrix which comprises nanoparticles to tune the refractive index of the layer. Further, in some embodiments according to tis disclosure, and depending on the lens geometry chosen for focusing elements 903, 905 and 907 (for example, convex or concave lenses) one or more of sealing layer 901 or focusing elements 903, 905 and 907 are constructed from a low-RI material, for example, a material having an RI of less than 1.4, a material having an RI between 1.30 and 1.35, or a material having an RI of less than 1.3. In certain embodiments, one or more of sealing layer 901, focusing elements 903, 905 and 907, or optical spacer 913 are constructed from a polymeric matrix which does not comprise nanoparticles to tune the refractive index of the layer.

As shown in the illustrative example of FIG. 9A, the micro-optic security device further comprises a first arrangement of image icons associated with a first characteristic color (in this illustrative example, blue, though other colors are possible and within the contemplated scope of this disclosure) disposed within a first layer 909. Additionally, in some embodiments according to this disclosure, the micro-optic security device comprises a second arrangement of image icons associated with a second characteristic color (in this illustrative example, magenta, though other colors are possible and within the contemplated scope of this disclosure). According to certain embodiments, the space between the image icons of first layer 909 and second layer 911 comprises substantially colorless material (for example, unpigmented polymer).

According to certain embodiments, at a first viewing angle, each of focusing elements 903, 905 and 907 focuses light entering the micro-optic security device at regions within first layer 909 and second layer 911 along paths converging at focal points 915, 917 and 919, respectively. By the same token, light exits the micro-optic security device from focal points 915, 917 and 919 along the same paths shown in the figure. As noted elsewhere in this disclosure, subtly modulating the positions of pigmented image icons relative to the path taken by light arriving at the micro-optic security device in a direction associated with the first viewing angle to each of focal points 915, 917 and 919 (referred to herein as a "focal path") can permute the colors provided in a synthetic image provided by the micro-optic system beyond the two characteristic colors used for image icons in first layer 909 and second layer 911.

As a first example, when an image icon 921a associated with the first characteristic color and an image icon 921b associated with the second characteristic color both lie on the same focal path for a focusing element, the component of the synthetic image provided by focusing element 903 has a color which is a mixture of the first characteristic color and the second characteristic color. In this non-limiting example, mixing the first characteristic color (blue) with the second characteristic color (magenta) produces a deep purple 923.

As a second example, when an image icon 925a associated with the first characteristic color is offset from the focal path of a focusing element, and an image icon 925b associated with the second characteristic color lies on the focal path, the component of the synthetic image provided by focusing element 905 has a color which is a mixture of the first characteristic color, a colorless region and the second characteristic color. In this non-limiting example, offsetting image icon 925a relative to the focal path produces a color 927, which is a pinkish shade of purple. Note that, in this non-limiting example, the contribution of the first characteristic color to color 927 is primarily diluted by the offset of image icon 925a from the focal path, while the contribution of the second characteristic color is substantially unaffected.

As a third example, when an image icon 929a associated with the first characteristic color is positioned on the focal path of a focusing element and an image icon 929b associated with the second characteristic color is offset from the focal path of the focusing element, the component of the synthetic image provided by focusing element 907 has a color 931, which is a mixture of the first characteristic color, the second characteristic color, and the substantially colorless regions between image icons of second layer 911. In this particular example, color 931 comprises a blueish shade of purple. Note that, in this illustrative example, the contribution of the first characteristic color is substantially unaffected, but the contribution of the second characteristic color to color 931 is diluted by the offset of image icon 929b from the focal path.

FIG. 9B provides further explanatory examples of achieving permutations of a limited set of characteristic colors in a synthetic image according to various embodiments of this disclosure.

Referring to the non-limiting example of FIG. 9B, a second subsection 991 of a micro-optic device is shown in the FIG. 9B. For convenience of reference, second subsection 991 utilizes the same construction as first subsection 900 shown in FIG. 9A. As shown in this illustrative example, second subsection 991 comprises seal layer 901, focusing elements 903, 905 and 907, and an optical spacer 913, which are of equivalent construction to their counterpart embodiments described with reference to FIG. 9A. Similarly, second subsection 991 comprises a first layer 909 and second layer 911, which are equivalent to their counterpart embodiments in FIG. 9A.

According to certain embodiments, by offsetting an image icon 933 associated with the first characteristic color from the focal path of a focusing element, and not providing an image icon in second layer 911, the component of a synthetic image provided by focusing element 903 has a color 935, which is a combination of the first characteristic color and substantially colorless material within first layer 909. In this particular example, color 935 is a lighter shade of the first characteristic color, which in this example comprises a light shade of blue.

In some embodiments according to this disclosure, by omitting an image icon near the focal path of focusing element 905 and offsetting an image icon 937 from the focal path, the component of a synthetic image provided by focusing element 905 has a color 939, which is a combination of the second characteristic color and substantially colorless material within second layer 911. In this non-limiting example, color 939 is a lighter shade of the second characteristic color, which in this illustrative example comprises a light pink.

In various embodiments according to this disclosure, by offsetting both an image icon 941 associated with the first characteristic color and an image icon 941b from the path of focusing element 907, the component of the synthetic image provided by focusing element 907 has a color 943, which is a combination of the first characteristic color, the second characteristic color and substantially colorless material within first layer 909 and second layer 911. In this non-limiting example, color 943 comprises a lavender color.

Referring to the non-limiting example of FIG. 9C, a third subsection 993 of a micro-optic device is shown in the FIG. 9C. For convenience of reference, third subsection 993 utilizes the same construction as first subsection 900 shown in FIG. 9A. As shown in this illustrative example, third subsection 993 comprises seal layer 901, focusing elements 903, 905 and 907, and an optical spacer 913, which are of equivalent construction to the counterpart embodiments described with reference to FIG. 9A. Similarly, third subsection 993 comprises a first layer 909 and second layer 911, which are equivalent to their counterpart embodiments in FIG. 9A.

Referring to the non-limiting example of FIG. 9C, according to certain embodiments, by positioning an image icon 945 associated with the first characteristic color on the focal path of focusing element 903 and not positioning an image icon associated with the second characteristic color on, or proximate to, the focal path of focusing element 903, the color 947 of component of the synthetic image projected in part by focusing element 903 is the first characteristic color.

According to various embodiments, by positioning an image icon 949 associated with the second characteristic color on the focal path of focusing element 905, and not positioning an image icon associated with the first characteristic color on, or proximate to, the focal path of focusing element 905, the color 951 of the contribution of focusing element 905 to a synthetic image is the second characteristic color.

Similarly, in various embodiments according to this disclosure, by not positioning any colored image icons on, or proximate to the focal path of focusing element 907, the contribution of focusing element 907 to the synthetic image will, like the regions between the image icons of first layer 909 and second layer 911, be substantially colorless.

While modulating between permutations of characteristic colors has, in the examples of FIGS. 8 and 9A-C been described with reference to micro-optic systems using refractive focusing elements, embodiments according to this disclosure are not so limited, and the above-described color modulation effects can be produced in systems using reflective focusing elements (for example, micro-optic security device 100 in FIG. 1C). Additionally, while certain embodiments according to this disclosure have described achieving micro-optic cell level modulations of the color which the cell provides to a synthetic image through reference to systems with a two layer image icon structure, and image icons of associated with two characteristic colors, the present disclosure is not limited thereto. Embodiments comprising image icon structures with more than two layers, as well as embodiments with image icons associated with three or more characteristic colors are within the intended scope of this disclosure.

According to certain embodiments, further granularity in micro-level (as used in this disclosure, the term "micro-level" encompasses the color seen through a single focusing element in the absence of a colored substrate) colors output by a finite set of characteristic colors for icon elements can be achieved by modulating the size of the image icons associated with each characteristic color. According to some embodiments, the size of image icons associated with a particular characteristic color can be modulated by one or more of changing a line width of a line icon, removing partial image icons, or doubling image icons within a footprint of an image icon focusing element.

In some embodiments according to this disclosure, further granularity in macro-level (as used in this disclosure, "macro-level" encompasses colors seen when viewing a plurality of micro-optic cells at once) colors can arise in response to subtle variations in viewing angle such that, among micro-optic cells with similar image icon structures, image icons may be on a boundary between being within the focal path of the image icon focusing elements, giving rise to regions which exhibit intermediate colors between the colors associated with permutations of the first and second characteristic colors. Region 819 in FIG. 8 provides a non-limiting example of macro-level granularity in the colors observed when simultaneously viewing a plurality of micro-optic cells of a micro-optic security device. As shown in FIG. 8, in region 819, a visible color gradient comprising multiple shades of a characteristic color (as opposed to a sharp boundary) between two shades of color can be observed.

Figure 10A:
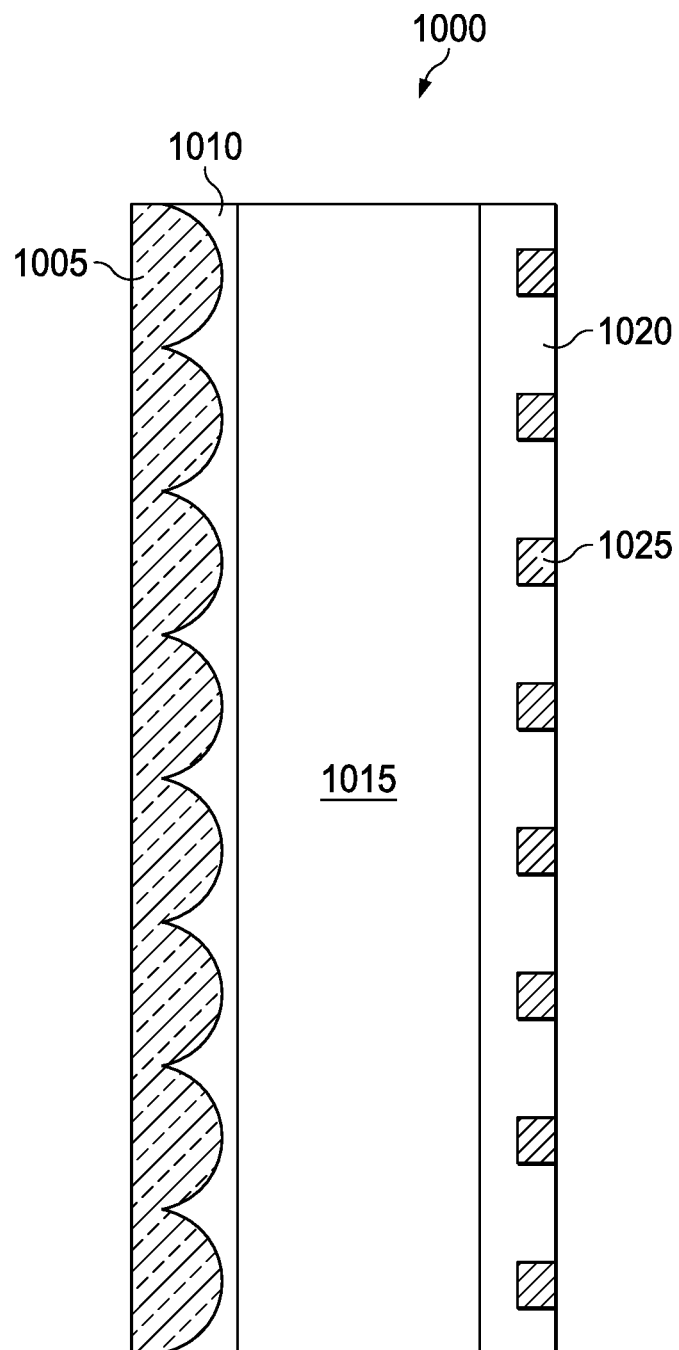
FIGS. 10A and 10B illustrate examples of micro-optic security devices according to various embodiments of this disclosure.
Figure 10B:
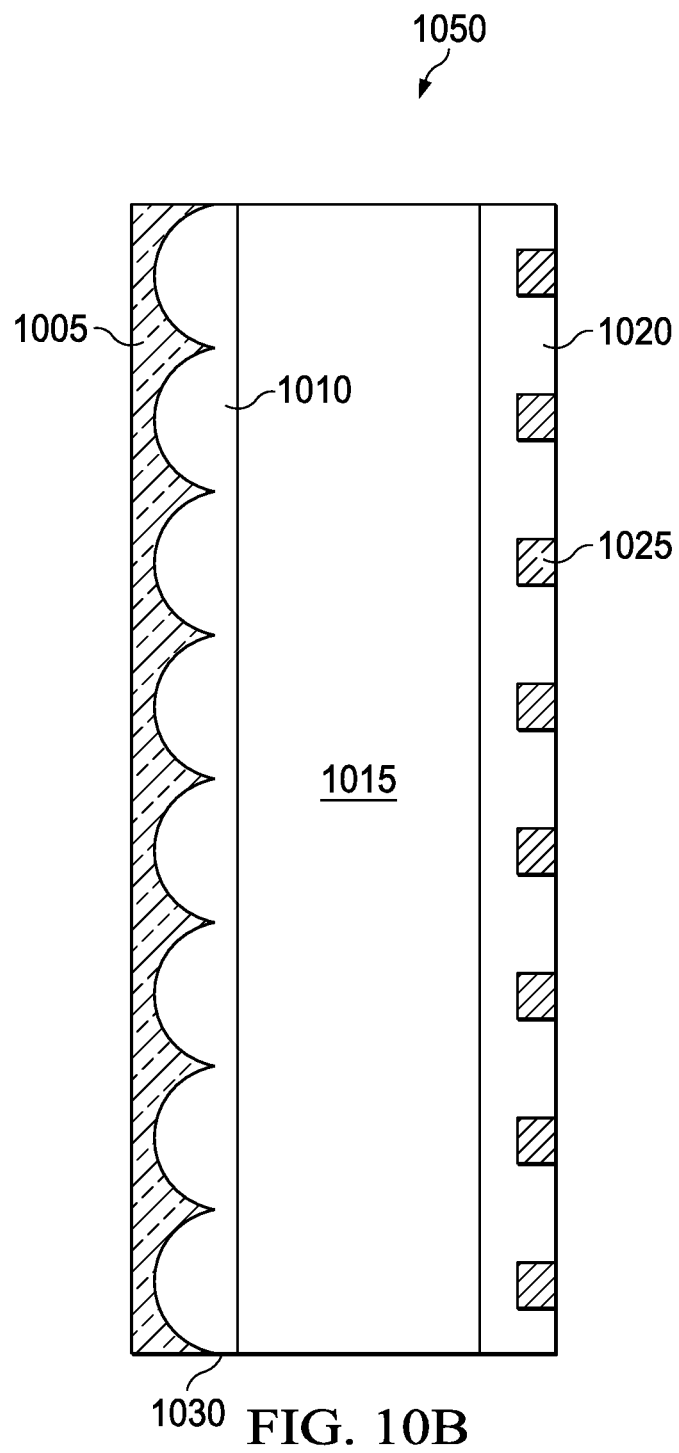

FIGS. 10A and 10B illustrate examples of micro-optic security devices according to certain embodiments of this disclosure.

Referring to the non-limiting example of FIG. 10A, an example of a micro-optic security device 1000 is shown in the figure. According to certain embodiments, micro-optic security device 1000 comprises a seal layer 1005, an arrangement of refractive focusing elements 1010, optical spacer 1015, and an image icon layer 1020 comprising a plurality of image icons 1025.

According to certain embodiments, micro-optic security device 1000 comprises a device capable of projecting a variety of synthetic images, including, without limitation, color shift effects, optically variable effects, and synthetically magnified images of content in image icon layer 1020 which appear to be above, and/or below the plane of micro-optic security device 1000. As shown in the illustrative example of FIG. 10A, seal layer 1005 is formed of a material having a higher refractive index than the material used to form arrangement of refractive focusing elements 1010. In some embodiments, seal layer 1005 is formed from a high-refractive material, such as an aromatic functionalized acrylate with dispersed nanozirconia nanoparticles. As one non-limiting example, seal layer 1005, in certain embodiments, has a refractive index of approximately 1.6 and is formed as a UV-cured layer of a liquid blend of a zirconium dioxide acrylate monomer mixture, a blend of bisphenol fluorene diacrylate and o-phenylphenolethyl acrylate, and a suitable photoinitiator.

According to various embodiments, arrangement of refractive focusing elements 1010 is formed from a material having a refractive index of 1.5 or less. Applying the lensmaker's equation, for a given lens radius, the overall thickness of micro-optic security device 1000 can be reduced by increasing the differential in refractive index between the material forming seal layer 1005 and the material comprising arrangement of refractive focusing elements 1010. In some embodiments, the difference in refractive index between the aforementioned two materials is greater than 0.1. In certain embodiments, the difference in refractive index between the material used to form seal layer 1005 and arrangement of refractive focusing elements 1010 is between 0.1-0.15, and in some embodiments, the differential is between 0.16 and 0.20. In various embodiments, the difference in refractive index is between 0.21 and 0.25, and in some embodiments, the difference in refractive index is 0.26 or greater.

By way of illustrative example, in at least one embodiment, arrangement of refractive focusing elements 1010 is formed from a layer of a UV-cured fluorinated acrylic material blend having a refractive index of ~1.35, for example, a mixture comprising one or more fluoro urethane acrylates and a suitable photoinitiator. While not limitative of the compounds suitable for use as a low-RI material in micro-optic security device 1000, fluorinated acrylic materials present certain manufacturing benefits, including without limitation, low tack, good adhesion to other acrylic materials, soil and chemical resistance, and a glass transition temperature that is sufficiently high to avoid deformation or excessive tackiness of the layer during manufacture. Further examples of materials suitable for arrangement of refractive focusing elements include, without limitation, silicone acrylates and silicone methacrylates.

As shown in the non-limiting example of FIG. 10A, micro-optic security device 1000 comprises an optical spacer 1015 (for example, optical spacer 115 in FIG. 1A). According to certain embodiments, optical spacer 1015 is formed from a section thin, substantially transparent film, such as 75 gauge polyethylene terephthalate (PET). According to various embodiments, micro-optic security device 1000 comprises an image icon layer 1020 (for example, image icon layer 615 in FIGS. 6A-6E). In certain embodiments, image icon layer 615 comprises a set of cast and cured retaining structures, which are subsequently filled with a UV curable material of one or more characteristic colors, which is cured to form a plurality of image icons (for example, image icon 1025).

Skilled artisans will appreciate that the overall thickness of embodiments of micro-optic security device 1000 can depend on a host of application-specific variables, including the visual effects to be produced by the system, desired lens size, and number of image icon layers. However, the differential in refractive index between a seal layer and focusing elements is such that it is possible to have an overall thickness of ~30 microns in a device with fully sealed spherical lenses capable of projecting synthetic images having a variety of optical effects (including, without limitation, color changes, multidirectional effects or orthoparallactic motion effects) with a single image icon layer.

While in the illustrative example of FIG. 10A, micro-optic security device 1000 has been described with reference to a configuration in which seal layer 1005 comprises a material having a higher index of refraction than arrangement of refractive focusing elements 1010, embodiments according to the present disclosure are not so limited.

FIG. 10B illustrates an example of a micro-optic security device 1050 in which the relative positions of the high-RI and low-RI materials in the seal layer 1005 and arrangement of refractive focusing elements 1010 is reversed. For convenience of cross reference, structural elements of micro-optic security device 1050 which are common to micro-optic security device 1000 in FIG. 10A are similarly numbered.

In some embodiments, the difference in refractive index between the seal layer and focusing elements can be reversed, such that the seal layer is formed of the lower RI material. In such embodiments, the geometry of the focusing elements similarly switches from concave to convex lenses, such as shown in FIG. 10B. Additionally, in certain embodiments, arrangement of refractive focusing elements 1010 comprises a transition region 1030 between the curved (i.e., concave or convex) lensing surfaces of the focusing elements and optical spacer 1015. According to certain embodiments, the presence of a transition region 1030, which ensures a minimum thickness throughout arrangement of refractive focusing elements 1010 improves the structural integrity of micro-optic security device 1050 by diminishing the likelihood of individual focusing elements of arrangement of refractive focusing elements 1010 "popping off" or otherwise separating from the system as a whole.

Similarly, while, in the illustrative example of FIG. 10A, micro-optic security device 1000 has been described with reference to an embodiment with a single layer icon structure, embodiments according to this disclosure are not so limited. In certain embodiments, micro-optic device has a multi-layer icon structure (for example, as shown with reference to FIGS. 9A-9C herein).

Examples of security devices according to certain embodiments of this disclosure include a security device which includes one or more arrangements of image icons; one or more arrangements of refractive image icon focusing elements; and a sealing layer, wherein the one or more arrangements of refractive image icon focusing elements is disposed above the one or more arrangements of image icons such that a portion of the one or more arrangements of refractive image icon focusing elements projects a synthetic image of a portion of the one or more arrangements of image icons, and wherein the one or more arrangements of refractive image icon focusing elements contact the sealing layer along a non-planar boundary.

Examples of security devices according to certain embodiments of this disclosure include security devices wherein at least one of the one or more arrangements of refractive image icon focusing elements and the sealing layer comprises an organic resin and nanoparticle mixture having a first refractive index.

Examples of security devices according to some embodiments of this disclosure include security devices wherein at least one of the arrangements of refractive image icon focusing elements and the sealing layer comprises a low-refractive index material, the low-refractive index material having a second refractive index, and wherein the difference between the first refractive index and second refractive index has a magnitude of 0.1 or greater.

Examples of security devices according to some embodiments of this disclosure include security devices wherein the low-refractive index material has a refractive index between 1.3 and 1.4.

Examples of security devices according to some embodiments of this disclosure include security devices wherein the low-refractive index material has a refractive of less than 1.3.

Examples of security devices according to some embodiments of this disclosure include security devices wherein the low-refractive index material comprises a fluorinated acrylate or a fluorinated urethane acrylate.

Examples of security devices according to some embodiments of this disclosure include security devices wherein the low-refractive index material comprises a perfluoro polyether compound.

Examples of security devices according to some embodiments of this disclosure include security devices wherein the nanoparticle mixture comprises one or more of aluminum oxide, zirconium dioxide, titanium dioxide, zinc sulfide or zinc telluride nanoparticles.

Examples of security devices according to various embodiments of this disclosure include security devices wherein the organic resin comprises an acrylate monomer.

Examples of security devices according to various embodiments of this disclosure include security devices wherein the organic resin comprises an acrylate oligomer.

Examples of security devices according to certain embodiments of this disclosure include security devices wherein the organic resin comprises one or more of a phenoxy benzyl acrylate, an O-phenlyphenoxyethyl acrylate, a phenylthioethyl acrylate, a bis-phenylthioethyl acrylate, a cumyl phenoxyl ethyl acrylate, a biphenylmethyl acrylate, a bisphenol A epoxy acrylate, a fluorene-type acrylate, a brominated acrylate, a halogenated acrylate or a melamine acrylate.

Examples of security devices according to certain embodiments of this disclosure include security devices wherein the organic resin comprises one or more of isodecyl acrylate, dipropylene glycol diacrylate, tripropylene glycol diacrylate, polyester tetraacrylate, trimethylolpropane triacrylate or hexanediol diacrylate.

Examples of security devices according to certain embodiments of this disclosure include security devices wherein the organic resin does not include a polarizing element.

Examples of security devices according to certain embodiments of this disclosure include security devices which do not include a sealing layer.

Examples of security devices according to some embodiments of this disclosure include security devices wherein the sealing layer has an index of refraction of 1.5 or higher.

Examples of security devices according to various embodiments of this disclosure include security devices wherein the sealing layer has an index of refraction of 1.6 or higher.

Examples of security devices according to various embodiments of this this disclosure include security devices wherein the arrangement of refractive image icon focusing elements comprises a transition region between lensing surfaces of the arrangement of refractive image icon focusing elements and a spacer layer.

Examples of security devices according to various embodiments of this disclosure include security devices, wherein a refractive image icon focusing element of the one or more arrangements of refractive image icon focusing elements has a diameter of greater than 30 microns.

Examples of security devices according to various embodiments of this disclosure include security devices, wherein a refractive image icon focusing element of the one or more arrangements of refractive image icon focusing elements has a diameter of less than 30 microns.

Examples of security devices according to certain embodiments of this disclosure include security devices comprising a spacer layer disposed between an arrangement of refractive image icon focusing elements and an arrangement of image icons, wherein the spacer layer comprises nanoparticles.

Examples of security devices according to some embodiments of this disclosure include security devices comprising a spacer layer integrated with an arrangement of refractive image icon focusing elements.

Examples of security devices according to various embodiments of this disclosure include security devices comprising two or more arrangements of refractive image icon focusing elements in contact along one or more non-planar boundaries.

Examples of security devices according to some embodiments of this disclosure include security devices wherein the security device has a thickness of 50 microns or less.

Examples of security devices according to certain embodiments of this disclosure include security devices wherein the security device has a thickness of 20 microns or less.

Examples of security devices according to various embodiments of this disclosure include security devices wherein the security device has a thickness of 15 microns or less.

Examples of security devices according to some embodiments of this disclosure include security devices comprising a machine-readable security device (Mr-SD).

Examples of security devices according to certain embodiments of this disclosure include security devices comprising two or more arrangements of image icons, wherein each arrangement of image icons comprises features having a characteristic color associated with the arrangement of image icons, and wherein each arrangement of image icons is disposed at a depth relative to the one or more arrangements of refractive image icon focusing elements associated with a wavelength-dependent focal length associated with the characteristic color associated with the arrangement of image icons.

Examples of security devices according to various embodiments of this disclosure include security devices wherein the synthetic image comprises shades of one or more characteristic colors moving at different rates.

Examples of security devices according to some embodiments of this disclosure include security devices comprising one or more arrangements of image icons; and one or more arrangements of refractive image icon focusing elements, the one or more arrangements of refractive image icon focusing elements comprising a mixture of an organic resin and nanoparticles, wherein the one or more arrangements of refractive image icon focusing elements is disposed above the one or more arrangements of image icons such that a portion of the one or more arrangements of refractive image icon focusing elements projects a synthetic image of a portion of the one or more arrangements of image icons, and wherein the mixture of the organic resin and nanoparticles has an index of refraction greater than 1.5.

Examples of security devices according to certain embodiments of this disclosure include security devices wherein the organic resin has an index of refraction of less than 1.5.

Examples of security devices according to various embodiments of this disclosure include security devices wherein the mixture of the organic resin and nanoparticles has an index of refraction greater than 1.6.

Examples of security devices according to some embodiments of this disclosure include security devices wherein the mixture of the organic resin and nanoparticles has an index of refraction greater than 1.7.

Examples of security documents according to certain embodiments of this disclosure comprise a substrate attached to one or more security devices according to embodiments of this disclosure.

Examples of security devices according to various embodiments of this disclosure include security devices wherein the synthetic image comprises a region of a third color, the third color comprising a permutation of at least one of the first characteristic color or the second characteristic color.

Examples of security devices according to certain embodiments of this disclosure include security devices wherein the synthetic images provided by the security device across a first range of viewing angles comprise at least nine (9) colors, wherein the at least nine colors comprise permutations of the first characteristic color and the second characteristic color.

Examples of security devices according to various embodiments of this disclosure include security devices comprising an arrangement of image icon focusing elements, wherein each image icon focusing element of the arrangement of image icon focusing elements is associated with a focal path, an image icon layer comprising one or more image icons associated with a first characteristic color and one or more image icons associated with a second characteristic color, and one or more regions between image icons comprising a volume of substantially colorless material, wherein, for a given viewing angle, a color is visible through each image icon focusing element, and wherein the color visible through each image icon focusing element at a first viewing angle is based on one or more of the first characteristic color, the second characteristic color, or the substantially colorless material.

Examples of security devices according to some embodiments of this disclosure include security devices wherein, in the absence of a colored substrate, the color visible through the image icon focusing element at the first viewing angle when no image icons are disposed on or offset from the focal path of the image icon focusing element, is a white associated with the volume of substantially colorless material.

Examples of security devices according to certain embodiments of this disclosure include security devices wherein, in the absence of a colored substrate, the color visible through the image icon focusing element at the first viewing angle when an image icon associated with the first characteristic color is offset from the focal path of the image icon focusing element has a component associated with a lightened shade of the first characteristic color, and wherein, in the absence of a colored substrate, the color visible through the image icon focusing element at the first viewing angle when an image icon associated with the second characteristic color is offset from the focal path of the image icon focusing element has a component associated with a lightened shade of the second characteristic color.

Examples of security devices according to certain embodiments of this disclosure include security devices wherein, in the absence of a colored substrate, the color visible through the image icon focusing element comprises a permutation from the group of permutations of the first characteristic color and the second characteristic color comprising: a first color associated with an image icon associated with the first characteristic color disposed on the focal path of the image icon focusing element, and the absence of an image icon associated with the second characteristic color on or offset from the focal path of the image icon focusing element, a second color associated with an image icon associated with the second characteristic color disposed on the focal path of the image icon focusing element, and the absence of an image icon associated with the first characteristic color on or offset from the focal path of the image icon focusing element, a third color comprising a white associated with the substantially colorless material associated with the absence of any image icons on or offset from the focal path of the image icon focusing element, a fourth color associated with an image icon associated with the first characteristic color offset from the focal path of the image icon focusing element, and the absence of an image icon associated with the second characteristic color on or offset from the focal path of the image icon focusing element, a fifth color associated with an image icon associated with the second characteristic color offset from the focal path of the image icon focusing element, and the absence of an image icon associated with the first characteristic color on or offset from the focal path of the image icon focusing element, a sixth color associated with an image icon associated with the first characteristic color disposed on the focal path of the image icon focusing element and an image icon associated with the second characteristic color disposed on the focal path of the image icon focusing element, a seventh color associated with an image icon associated with the first characteristic color disposed on the focal path of the image icon focusing element, and an image icon associated with the second characteristic color offset from the focal path of the image icon focusing element, an eighth color associated with an image icon associated with the second characteristic color disposed on the focal path of the image icon focusing element, and an image icon associated with the first characteristic color offset from the focal path of the image icon focusing element, and a ninth color associated with an image icon associated with the first characteristic color offset from the focal path of the image icon focusing element and an image icon associated with the second characteristic color offset from the focal path of the image icon focusing element. Examples of security devices according to certain embodiments of this disclosure include security devices comprising a first image icon associated with the first characteristic color, and a second image icon associated with the second characteristic color, wherein a ratio of a size of the first image icon relative to a size of the second image icon is such that, in the absence of a colored substrate, the color visible through the image icon focusing element comprises a tenth color, which is not one of the nine permutations of the first characteristic color and the second characteristic color.

Examples of security devices according to some embodiments of this disclosure include security devices comprising one or more of refractive image icon focusing elements or reflective image icon focusing elements.

Examples of security devices according to various embodiments of this disclosure include security devices wherein image icon focusing elements comprise a mixture of an organic resin and nanoparticles.

Examples of security documents according to various embodiments of this disclosure include security documents which include a substrate and a security device attached to the substrate. In some embodiments, the security device includes one or more arrangements of image icons, one or more arrangements of refractive image icon focusing elements, and a sealing layer comprising an organic resin and nanoparticles. In some embodiments, the one or more arrangements of refractive image icon focusing elements is disposed above the one or more arrangements of image icons such that a portion of the one or more arrangements of refractive image icon focusing elements forms a synthetic image of a portion of the one or more arrangements of image icons. In some embodiments, the one or more arrangements of refractive image icon focusing elements contact the sealing layer along a non-planar boundary.

Examples of security documents according to various embodiments of this disclosure include security documents which include a substrate and a security device attached to the substrate. In some embodiments, the security device includes one or more arrangements of image icons and one or more arrangements of refractive image icon focusing elements, the one or more arrangements of refractive image icon focusing elements comprising a mixture of an organic resin and nanoparticles. In certain embodiments, the one or more arrangements of refractive image icon focusing elements is disposed above the one or more arrangements of image icons such that a portion of the one or more arrangements of refractive image icon focusing elements forms a synthetic image of a portion of the one or more arrangements of image icons. In some embodiments, the mixture of the organic resin and nanoparticles has an index of refraction greater than 1.5.

Examples of security documents according to certain embodiments of this disclosure include security documents which include a substrate a security device attached to the substrate. In some embodiments, the security device includes one or more arrangements of image icons, one or more arrangements of refractive image icon focusing elements, and a spacer layer disposed between the one or more arrangements of image icons and the one or more arrangements of refractive image icon, the spacer layer comprising a mixture of an organic resin and nanoparticles. In certain embodiments, the one or more arrangements of refractive image icon focusing elements is disposed above the one or more arrangements of image icons such that a portion of the one or more arrangements of refractive image icon focusing elements forms a synthetic image of a portion of the one or more arrangements of image icons. In some embodiments, the mixture of the organic resin and nanoparticles has an index of refraction greater than 1.5.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A security device comprising:
    one or more arrangements of image icons;
    one or more arrangements of refractive image icon focusing elements; and
    a sealing layer comprising an organic resin and nanoparticles,
    wherein the one or more arrangements of refractive image icon focusing elements is disposed above the one or more arrangements of image icons such that a portion of the one or more arrangements of refractive image icon focusing elements forms a synthetic image of a portion of the one or more arrangements of image icons,
    wherein the one or more arrangements of refractive image icon focusing elements contact the sealing layer along a non-planar boundary, and
    wherein the nanoparticles comprised in the sealing layer are dispersed in the sealing layer and affect a geometry of the refractive image icon focusing elements.

2. The security device of claim 1, wherein the nanoparticles comprise one or more of aluminum oxide, zirconium dioxide, titanium dioxide, zinc sulfide or zinc telluride.

3. The security device of claim 1, wherein the organic resin comprises an acrylate monomer.

4. The security device of claim 1, wherein the organic resin comprises an acrylate oligomer.

5. The security device of claim 1, wherein the organic resin comprises one or more of a phenoxy benzyl acrylate, an o-phenlyphenoxyethyl acrylate, a phenylthioethyl acrylate, a bis-phenylthioethyl acrylate, a cumyl phenoxyl ethyl acrylate, a biphenylmethyl acrylate, a bisphenol a epoxy acrylate, a fluorene-type acrylate, a brominated acrylate, a halogenated acrylate or a melamine acrylate.

6. The security device of claim 1, wherein the organic resin comprises one or more of isodecyl acrylate, dipropylene glycol diacrylate, tripropylene glycol diacrylate, polyester tetraacrylate, trimethylolpropane triacrylate or hexanediol diacrylate.

7. The security device of claim 1, wherein the organic resin does not include a polarizing element.

8. The security device of claim 1, wherein the sealing layer has an index of refraction of 1.5 or higher.

9. The security device of claim 1, wherein the sealing layer has an index of refraction of 1.6 or higher.

10. The security device of claim 1, wherein a refractive image icon focusing element of the one or more arrangements of refractive image icon focusing elements has a diameter of greater than 30 microns.

11. The security device of claim 1, further comprising a spacer layer disposed between an arrangement of refractive image icon focusing elements and an arrangement of image icons,
    wherein the spacer layer comprises nanoparticles.

12. The security device of claim 1, further comprising a spacer layer integrated with an arrangement of refractive image icon focusing elements.

13. The security device of claim 1, further comprising two or more arrangements of refractive image icon focusing elements in contact along one or more non-planar boundaries.

14. The security device of claim 1, wherein the security device has a thickness of 50 microns or less.

15. The security device of claim 1, further comprising a machine-readable security device.

16. A security document comprising the security device of claim 1.

17. A security device comprising:
one or more arrangements of image icons; and
a layer of one or more arrangements of refractive image icon focusing elements, the one or more arrangements of refractive image icon focusing elements comprising a mixture of an organic resin and nanoparticles,
wherein the one or more arrangements of refractive image icon focusing elements is disposed above the one or more arrangements of image icons such that a portion of the one or more arrangements of refractive image icon focusing elements forms a synthetic image of a portion of the one or more arrangements of image icons,
wherein the mixture of the organic resin and nanoparticles has an index of refraction greater than 1.5, and
wherein the nanoparticles are dispersed in the layer of the one or more arrangements of refractive image icon focusing elements and affect a geometry of the refractive image icon focusing elements.

18. The security device of claim 17, wherein the organic resin has an index of refraction of less than 1.5.

19. The security device of claim 17, wherein the nanoparticles comprise one or more of aluminum oxide, zirconium dioxide, titanium dioxide, zinc sulfide or zinc telluride.

20. The security device of claim 17, wherein the organic resin comprises an acrylate monomer.

\* \* \* \* \*